(12) United States Patent
Davis et al.

(10) Patent No.: US 10,670,723 B2
(45) Date of Patent: Jun. 2, 2020

(54) PROJECTILE POSITION MEASUREMENT USING NON-LINEAR CURVE FITTING

(71) Applicant: UNIVERSITY OF MARYLAND, College Park, MD (US)

(72) Inventors: Christopher C. Davis, Annapolis, MD (US); John Robertson Rzasa, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 451 days.

(21) Appl. No.: 15/522,220

(22) PCT Filed: Nov. 4, 2015

(86) PCT No.: PCT/US2015/058966
§ 371 (c)(1),
(2) Date: Apr. 26, 2017

(87) PCT Pub. No.: WO2016/073561
PCT Pub. Date: May 12, 2016

(65) Prior Publication Data
US 2017/0336509 A1 Nov. 23, 2017

Related U.S. Application Data

(60) Provisional application No. 62/075,044, filed on Nov. 4, 2014.

(51) Int. Cl.
*G01S 17/46* (2006.01)
*G01S 17/88* (2006.01)
(Continued)

(52) U.S. Cl.
CPC .......... *G01S 17/46* (2013.01); *A63B 71/0605* (2013.01); *G01S 17/88* (2013.01);
(Continued)

(58) Field of Classification Search
CPC ..... G01S 17/88; G01S 17/46; A63B 71/0605; A63B 69/0013
See application file for complete search history.

(56) References Cited

U.S. PATENT DOCUMENTS 727,633 A 5/1903 Humphreys
1,868,088 A 7/1932 Blair
(Continued)

*Primary Examiner* — Hovhannes Baghdasaryan
(74) *Attorney, Agent, or Firm* — Rosenberg, Klein & Lee

(57) ABSTRACT

An electronic home plate provides assistance to an umpire in determining whether a pitch results in a "strike" or a "ball." The home plate is implemented with LEDs producing discrete pulses of infrared light beams extending vertically. As a moving ball intersects the pulses, light from the pulses is scattered and incident on photodetectors embedded in the home plate, producing a series of data points. Two stages of light compensation compensate the data points for ambient light, first by applying an offset current to a photodetector through a PNP transistor, and second by subtracting a measurement immediately before a pulse from a measurement during the pulse. A processor then fits the data points to a curve, to compute vertical and lateral positions of the ball, thereby determining whether the pitch passed within a strike zone. Other applications may similarly analyze the trajectory of other projectiles for various purposes.

18 Claims, 17 Drawing Sheets

(51) Int. Cl.
  *G09B 19/00* (2006.01)
  *A63B 71/06* (2006.01)
  *A63B 102/18* (2015.01)
(52) U.S. Cl.
  CPC ...... *G09B 19/0038* (2013.01); *A63B 2102/18* (2015.10); *A63B 2102/182* (2015.10); *A63B 2207/02* (2013.01); *A63B 2220/805* (2013.01)

(56) References Cited

U.S. PATENT DOCUMENTS

| | | |
|---|---|---|
| 2,113,899 A | 4/1938 | Oram |
| 2,121,742 A | 6/1938 | McLaughlin |
| 4,563,005 A | 1/1986 | Hand et al. |
| 4,577,863 A | 3/1986 | Ito et al. |
| 4,583,733 A | 4/1986 | Ito et al. |
| 4,972,171 A | 11/1990 | Johnson et al. |
| 5,401,016 A | 3/1995 | Heglund et al. |
| 5,419,549 A | 5/1995 | Galloway et al. |
| 5,553,846 A | 9/1996 | Frye et al. |
| 5,553,860 A | 9/1996 | Zelikovich |
| 5,602,638 A | 2/1997 | Boulware |
| 5,676,607 A | 10/1997 | Stumpf |
| 5,833,549 A | 11/1998 | Zur et al. |
| 5,984,810 A | 11/1999 | Frye et al. |
| 6,042,492 A | 3/2000 | Baum |
| 6,159,113 A | 12/2000 | Barber |
| 6,350,211 B1 | 2/2002 | Kolmar |
| 6,358,164 B1 | 3/2002 | Bracewell et al. |
| 6,688,996 B1 | 2/2004 | Mitani |
| 6,695,725 B1 | 2/2004 | Burns, Jr. |
| 6,709,351 B2 | 3/2004 | Hori |
| 7,150,688 B1 | 12/2006 | Coulbourn |
| 7,270,616 B1 | 9/2007 | Snyder |
| 7,335,116 B2 | 2/2008 | Petrov |
| 8,591,356 B2 | 11/2013 | Walker |
| 2003/0171169 A1 | 9/2003 | Cavallaro et al. |
| 2006/0183546 A1 | 8/2006 | Addington et al. |
| 2009/0298622 A1 | 12/2009 | Roberts |
| 2013/0039538 A1 | 2/2013 | Johnson et al. |
| 2014/0206480 A1 | 7/2014 | Davis et al. |

PROJECTILE POSITION MEASUREMENT USING NON-LINEAR CURVE FITTING

RELATED PATENTS AND APPLICATIONS

This application is a National Stage Application of PCT/US2015/058966, filed on Nov. 4, 2015, which is based on U.S. Provisional Patent Application No. 62/075,044, filed on Nov. 4, 2014, which is incorporated herein by reference.

BACKGROUND OF THE INVENTION

The subject system and method are generally directed to the detection of a projectile and a measurement of its position. In particular, although not exclusively, a detection system measures the position, speed, and other trajectory features of a projectile such as a ball as it crosses discretely pulsed beams of light projected by the system. Although the system has particular applications in the games of baseball or softball, where it may be installed in a home plate and used to determine whether a ball has entered a predetermined strike zone, the system is also useful in other contexts where the measurement of a projectile position and/or speed within a predetermined three-dimensional space is desired.

In the games of baseball and softball, the strike zone is a conceptual right pentagonal prism over the home plate which defines the boundaries through which a pitch must pass in order to be counted as a "strike" when a batter does not swing the bat.

As shown in FIG. 1, the top 10 of the strike zone 12 is defined in the official rules of baseball as a horizontal line at the midpoint between the top of the batter's shoulders and the top of the uniform pants. The bottom 14 of the strike zone 12 is a line at the hollow beneath the kneecap of the batter. The right and left boundaries 16 and 18 of the strike zone 12 correspond to the edges 20 and 22 of the home plate 24. A pitch that touches the outer boundary of the strike zone is as much a strike as a pitch that is thrown right down the center of the strike zone. A pitch at which the batter does not swing and which does not pass through the strike zone is called a ball.

The home plate, formally designated home base in the rules, is a final base that the player must touch to score. The home plate is a five-sided slab of whitened rubber that is set at ground level. The batter stands in the batter's box when ready to receive a pitch from a pitcher.

In baseball, an umpire is a person charged with officiating the game, including beginning and ending the game, enforcing the rules of the game and the grounds, making judgment calls on plays, and handling disciplinary actions. In a game officiated by two or more umpires, the umpiring chief (home-plate umpire) is the umpire who is in charge of the entire game. This umpire calls balls and strikes, as well as fair balls and foul balls short of first/third base, and makes most calls concerning the batter or base runners near home plate. The umpire 26 is usually positioned behind the catcher's box and declares whether the pitch is a strike or a ball.

It is clear that human error may be present in judging whether a pitch passes through the strike zone or outside the boundaries. This is especially true in the case of little league and scholastic league baseball games where the umpires are typically non-professional and/or volunteers. The probability of human errors in these situations is increased.

It is therefore desirable to provide a mechanism which reduces human error in categorizing the pitch as a "ball" or a "strike" especially for use in baseball and/or softball leagues where the umpires are typically non-professional or volunteers.

It is additionally desirable for this mechanism to be efficient in processing and power consumption while also being accurate in its categorization.

It is additionally desirable for this mechanism to accurately and efficiently operate in a variety of fluctuating lighting conditions.

SUMMARY OF THE INVENTION

In one aspect of the present invention, a ball detection system includes a housing; first and second light emitter sets disposed in the housing, the second light emitter set disposed a predetermined distance behind the first light emitter set along an expected trajectory path of a ball, each light emitter set including a plurality of light emitters, each light emitter set configured to emit a series of discrete pulses of light; one or more photodetectors disposed in the housing, the one or more photodetectors generating a photocurrent when contacted by light, wherein, when a ball intersects a pulse of light of either of the light emitter sets, a scattered light signal is reflected from the ball to contact at least one of the one or more photodetectors; one or more ambient light compensation circuits coupled to the one or more photodetectors and reducing the photocurrent of each of the one or more photodetectors by an offset current; one or more converter circuits coupled to the one or more photodetectors and converting the photocurrent of each of the one or more photodetectors to a detection voltage; and a processor. The processor may be configured to read a measurement of a detection voltage from one of the one or more converter circuits as a detection voltage data point, compensate each of a plurality of detection voltage data points based on a baseline voltage value, fit a plurality of compensated detection voltage data points to a voltage curve using a curve-fitting algorithm, and compute at least one vertical position of the ball from one or more voltages curves generated by the curve-fitting algorithm.

The one or more photodetectors may include a left photodetector and a right photodetector each disposed in the housing between the first and second light emitter sets, the left and right photodetectors disposed symmetrically along an axis of a detection surface of the housing, and the one or more converter circuits include a left converter circuit converting a photocurrent of the left photodetector to a left detection voltage and a right converter circuit converting a photocurrent of the right photodetector to a right detection voltage. The processor may be further configured to fit a plurality of left detection voltage data points, measured from the left converter circuit, to a left curve, fit a plurality of right detection voltage data points, measured from the right converter circuit, to a right curve, and compute at least one lateral position of the ball from the left and right curve.

The first and second light emitter sets may each emit discrete pulses of light alternating with each other. The one or more photodetectors may include a left photodetector and a right photodetector each disposed in the housing between the first and second light emitter sets, the left and right photodetectors disposed symmetrically along an axis of a detection surface of the housing, and the one or more converter circuits include a left converter circuit converting a photocurrent of the left photodetector to a left detection voltage and a right converter circuit converting a photocurrent of the right photodetector to a right detection voltage. The processor may be further configured to fit a first plurality of left detection voltage data points, measured from the left converter circuit when the first light emitter set emits a pulse of light, to a first left curve, fit a first plurality of right detection voltage data points, measured from the right converter circuit when the first light emitter set emits a pulse of light, to a first right curve, fit a second plurality of left detection voltage data points, measured from the left converter circuit when the second light emitter set emits a pulse of light, to a second left curve, fit a second plurality of right detection voltage data points, measured from the right converter circuit when the second light emitter set emits a pulse of light, to a second right curve, compute the at least one vertical position of the ball from either the first left and second left curve or the first right and second right curve, and compute at least one lateral position of the ball from either the first left and first right curve or the second left and second right curve.

The baseline voltage value may be a measurement of a detection voltage of one of the one or more converter circuits measured when neither the first nor second light emitter sets emit light. The processor may be further configured to determine the present baseline voltage value before each discrete pulse of light emitted by the first and second light emitter sets, and compensate a detection voltage data point by subtracting the present baseline voltage value from the value of the detection voltage data point.

The one or more ambient light compensation circuits may each include a PNP transistor, each PNP transistor applying the offset current to a corresponding one of the one or more photodetectors, and a value of the offset current may be selected when a corresponding one of the one or more converter circuits outputs a detection voltage value greater than a predetermined set-point while neither the first nor second light emitter sets emit light, the offset current selected to alter the detection voltage value to or below the predetermined set-point. The predetermined set-point may be 0 V.

The one or more converter circuits may be transimpedance amplifier circuits.

A narrow band filter may cover the one or more photodetectors and blocks light external to a wavelength range. The wavelength range may be a range emitted by the first or second light emitter sets. The wavelength range may be 940 nm±25 nm.

The first and second light emitter sets may each emit the series of pulses of light in pulses of 25 μs with a 5% duty cycle.

The curve-fitting algorithm may be a nonlinear Levenberg-Marquadt curve fitting algorithm.

In another aspect of the invention, a method of detecting at least one vertical position of a ball includes emitting a series of pulses of light from first and second light emitter sets, the pulses of the first light emitter set alternating with the pulses of the second light emitter set; generating a plurality of compensated detection voltage data points; fitting at least a subset of the plurality of compensated detection voltage data points to one or more voltage curves using a curve-fitting algorithm; and computing the at least one vertical position of the ball from the one or more voltage curves. The plurality of compensated detection voltage data points may be generated by repeatedly receiving, in one or more photodetectors, a scattered light signal resulting from the ball intersecting a pulse of the series of pulses of light, generating a photocurrent in at least one of the one or more photodetectors in response to receipt of the scattered light signal, reducing the photocurrent of the at least one photodetector by an offset current using one or more ambient light compensation circuits, converting the reduced photocurrent to a detection voltage in one or more converter circuits, measuring a value of the detection voltage as a detection voltage data point, and compensating the detection voltage data point based on a baseline voltage value.

The method may further include, before emitting each pulse of the series of pulses of light, generating an off-pulse photocurrent in at least one of the one or more photodetectors in response to ambient light levels, reducing the off-pulse photocurrent by the offset current using the one or more ambient light compensation circuits, converting the reduced off-pulse photocurrent to an off-pulse detection voltage in the one or more converter circuits, and measuring a value of the off-pulse detection voltage as a present baseline voltage value. The compensation of the detection voltage data point may include subtracting the present baseline voltage value from the value of the detection voltage data point.

The one or more ambient light compensation circuits may each include a PNP transistor, the PNP transistor applying the offset current to the least one photodetector. A value of the offset current may be selected when a detection voltage value greater than a predetermined set-point is measured while neither the first nor second light emitter sets emit light, the offset current selected to alter the detection voltage value to or below the predetermined set-point.

In another aspect of the invention, a projectile detection system may include a housing; first and second light emitter sets disposed in the housing, the second light emitter set disposed a predetermined distance behind the first light emitter set along an expected trajectory path of a ball, each light emitter set including a plurality of light emitters, each light emitter set configured to emit a series of discrete pulses of light; one or more photodetectors disposed in the housing, the one or more photodetectors generating a photocurrent when contacted by light, wherein, when a projectile intersects a pulse of light of either of the light emitter sets, a scattered light signal is reflected from the ball to contact at least one of the one or more photodetectors; one or more ambient light compensation circuits coupled to the one or more photodetectors and reducing the photocurrent of each of the one or more photodetectors by an offset current; and a processor. The processor may be configured to read an amplitude of a detection photocurrent from one of the one or more photodetectors as a detection data point, compensate each of a plurality of detection data points based on a baseline data value, fit a plurality of compensated detection data points to a data curve using a curve-fitting algorithm, and compute at least one vertical position of the ball from one or more data curves generated by the curve-fitting algorithm.

DETAILED DESCRIPTION OF THE PREFERRED EMBODIMENTS

Figure 1:
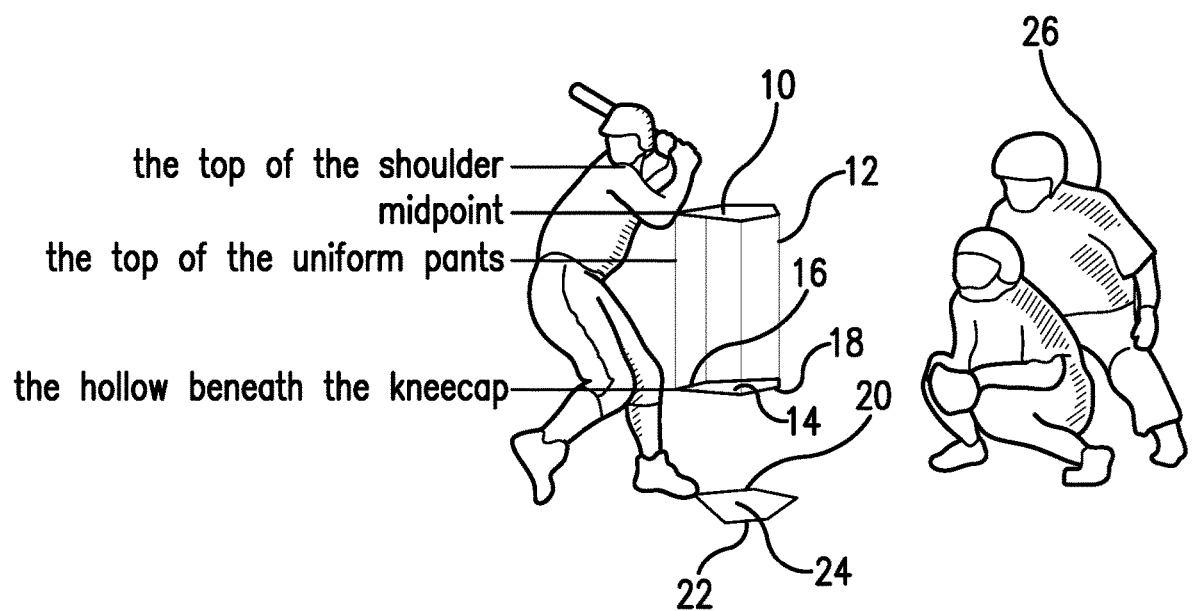
FIG. 1 is a pictorial view demonstrating the strike zone over a home plate, according to the prior art.

Reference will now be made in detail to exemplary embodiments, which are illustrated in the accompanying drawings, wherein like reference numerals refer to the like elements throughout. The embodiments are described below in order to explain the disclosed system and method by referring to the figures.

The description below will largely be presented herein in correspondence to baseball games. However, the principles and the scope of the invention are fully applicable to other games, and indeed to non-sports contexts, as will be elaborated on further herein.

U.S. patent application Ser. No. 13/833,366, published as US Patent Application Publication No. 2014/0206480 on Jul. 24, 2014 and pending as of the filing of this application, describes an "electronic home plate system" which projects beams of light (preferably infrared) extending above the home plate. When the ball crosses over the electronic home plate system, light from the beams contacting the ball is reflected into a scattered light signal, which is received by photodetectors also in the electronic home plate system. Processors may then analyze the intensity of the received scattered light signal, and the timing of its receipt, to compute the position of the ball as it crosses the light beams, and also its speed. The above-described application is incorporated herein by reference.

Referring to FIGS. 2-5 and 7, there is provided a ball or projectile detection system 30 (also referred to in this context as an electronic home plate or EHP) which is a low-cost and effective home plate for baseball and softball games, containing electronic and opto-electronic components adapted for detection and indication of the presence, position, and speed of a baseball passing over home plate.

The electronic home plate is designed to assist umpires in determining if a pitch is a "ball" or a "strike", and may be used in baseball training exercises. Although the subject electronic home plate is envisioned for use in baseball games of both professional and non-professional categories, the subject electronic home plate may be primarily targeted to Little League and scholastic league markets where the umpires are typically non-professional and volunteers.

The electronic home plate also has great value as a training aid for pitchers. The system facilitates obtaining an XY map of positions and speeds of pitches, i.e., a pitcher can deliver a number of pitches over the electronic home plate and obtain the XY map of where all pitches went, along with the speed of each one.

The electronic home plate 30 is designed to automatically detect a ball 32 as it passes between the outer edges 34, 36 of the home plate 30 which substantially coincide with lateral boundaries 38, 40 of the strike zone 42. The electronic home plate 30 is also configured to automatically calculate the height of the ball passing over the EHP, and to determine if the calculated height falls between the top and bottom boundaries 44, 46, respectively, of the strike zone 42 which is adjusted for the height of a batter of interest to correspond to the knee-to-chest strike zone, as depicted in FIG. 1.

In order to deliver the intended functionality, the electronic home plate 30 is provided with sub-systems embedded into the housing of the ball detection system. These include:

- eye-safe light emitters such as, for example, light emitting diodes emitting in near-infrared or other invisible ranges of the light spectrum, or possibly solar-blind UV emitters;
- at least one sensitive photodetector, preferably two, equipped with electronics for amplification and conditioning of the output signal;
- electronic components including a wireless transceiver (for example, a Zigbee or Bluetooth radio), optical signal processing electronics, and a microcomputer (that is, a processor), which may be in the form of FPGA (Field Programmed Gate Array);
- a battery, or alternatively, a wired power source;
- a remote controller sub-system for wireless communication with the electronic home plate which has its own transceiver (such as, for example, a Zigbee or Bluetooth radio), to produce, transmit and receive wireless signals to/from the transceiver embedded into the electronic home plate, and
- an indication system, which in response to the detection of the ball passing within the boundaries of the strike zone, produces a "strike" signal in optical, audio, wireless, or some other format.

Specifically, as shown in FIGS. 2-5 and 7, the EHP 30 is equipped with two sets 48 of light emitters 50, each set 48 including a plurality of light emitters 50 arranged in a row. The light emitters 50 generate light beams 52 extending vertically above the EHP. The first light emitter set 48a is positioned at the "front" 49 of the EHP, while the second light emitter set 48b is positioned at the "back" 53 of the EHP where the housing 56 tapers. That is, the second light emitter set 48b is positioned behind the first light emitter set 48a along the expected trajectory path of the ball 32. The rows of the first and second light emitter sets 48a, 48b are parallel to each other, and the distance between them is known and predetermined, and may therefore be used in computations that will be described further herein. It is noted that more than two light emitter sets may be used, with known distance between each set, potentially improving the detection resolution of the system although at a cost of power consumption and processing time.

The light emitters 50 may be light emitting diodes (LEDs), and hereinafter will be referred to as such. These LEDs 50 may each be a particular width, thereby projecting a "curtain" of light formed from the light beams 52 which is of said particular width at the base. Additionally, the LEDs may include integrated lenses (not separately depicted) which spread the light at a predetermined angle, resulting in diverging light beams, and this divergence is used in part to compute the height of a ball by computations that will be described further herein. In the depicted embodiment, an angle of ±3° has been determined to be preferable in providing sufficient information for these computations, without sacrificing intensity of the light beams 52 or excessively overlapping the light beams 52 from the first light emitter set 48a with those of the second light emitter set 48b.

Eye safety in the present system is a major consideration, as LEDs may be a distraction or even a blinding or seizure hazard if they produce excessive power at certain wavelengths. The EHP 30 may therefore use light emitters 50 that are both eye safe and generate sufficient power for the photodetector to detect the signal. Calculations and testing for the depicted embodiment indicate that satisfactory performance may be attained with LEDs operating in the 800-1000 nm range (within the near-infrared division of the spectrum) that satisfy CDRH Class 1 safety standards. That is to say, the light emitters 50 may be IR emitters. More preferably, a range of 940±25 nm has additionally been determined to be a solar absorption band where the spectral irradiance is reduced to 25% of neighboring wavelengths; thereby, the system may filter out the neighboring wavelengths and therefore the majority of solar light without sacrificing detection of light from the light emitters 50.

The light emitters 50 are preferably disposed in the detection surface 58 of the housing 56. In the context of an electronic home plate 30, the detection surface 58 is preferably the surface of the housing 56 facing up; that is, an upper member. However, it is noted that other embodiments may use a different style of housing exterior to the plate itself, which may be placed to the side of, behind, or above the home plate. In such embodiments, the detection surface is generally on the side of the housing facing the home plate; that is, on the side facing the space through which the ball is expected to travel (e.g. the strike zone).

In order to permit the passage of the generated light beams 52 through the detection surface 58 of the housing 56, the detection surface 58 may be formed with openings such as slits 91 in alignment with the light emitters 50 or the rows thereof. In other embodiments, the light emitters 50 may be on top of, rather than in or below, the detection surface 58.

The light beams 52 take the form of discrete pulses of lights emitted from the light emitters 50. By employing pulses instead of a continuous stream, the intensity of the beams may be improved, allowing for a much reduced gain in the detection circuitry, which lessens the effects of ambient light fluctuations. A low duty cycle also reduces power consumption of the system as a whole, which is particularly advantageous for a battery-powered embodiment. Additionally, use of discrete pulses reduces the number of data points received and analyzed, yet a sufficiently rapid pulse rate may still produce enough data points to accurately compute the trajectory characteristics of the ball. For example, switching from continuous light emission to a preferable pulse duration of 25 μs with a 5% duty cycle (resulting in a 2 kHz pulse rate) increases light intensity by a factor of 8.5 while reducing power consumption by 50%. Simulations of this configuration also show that it generates enough data points to give positional accuracy for a standard baseball (slightly below 3" in diameter) at speeds of up to 100 mph.

As suggested previously, the light beams 52 produced by the first light emitter set 48a should not intersect with those of the second light emitter set 48b, in order to provide conditions for receipt of two distinct scattered light signals (corresponding to two beam intersection events) when a ball passes through. This may be largely accomplished by a sufficient predetermined distance between the first and second light emitter sets 48a, 48b, and a sufficiently small angle of divergence resulting from the lenses of the light emitters 50. However, intersection may be eliminated entirely by an alternating pattern of pulses; that is, the first light emitter set 48a emits each light beam pulse out of sync with each light beam pulse emitted by the second light emitter set 48b. Additionally, in such an embodiment, the source of a scattered light signal may be determined in whole or in part by the timing of its receipt as compared to the most recently active light emitter set 48.

The EHP 30 is envisioned as a standard sized baseball home plate, except for the thickness defined by vertical dimensions of the home plate housing 56, which, as shown in FIGS. 2-3, 5, and 7, contains the necessary electronic components 57 adapted to detect, calculate, and indicate the presence, height, lateral location, and speed of a baseball passing over the EHP 30. The electronic home plate 30 includes the home plate housing 56 which has an upper member (that is, a detection surface) 58 and a bottom module 60. The upper member 58 and the bottom module 60 are vertically displaced each with respect to the other to define a space 62 there between which contain the electronics 57 of the EHP making the electronic home plate functional.

One or more photodetectors 64 is (are) embedded in the EHP 30 to detect the scattered light 66 incident on the photodetector(s). The optical sensors and amplifiers can respond quickly enough to detect a ball moving up to and in excess of 100 mph.

In order to measure height, only one photodetector (PD) is needed. In order to measure lateral position, at least a second photodetector is needed. With two large-area photodetectors, the FOV (Field-of-View) is big enough to detect scattered light signals received anywhere in the plate area, given the light intensities described above and ambient light compensation processes to be described further herein. When two photodetectors are employed, preferably the two are disposed between the first and second light emitter sets 48a, 48b, and positioned symmetrically along the axis of the housing 56 running from the first light emitter set 48a to the second light emitter set 48b. For example, a left photodetector 64a may be disposed a particular distance to the left of the axis of the housing 56, and a right photodetector 64b may be disposed the same particular distance to the right of the same axis.

A narrow band filter 102 is employed to block out some or all light outside of the emission spectrum of the LEDs. This filter may take the form of a colored glass bandpass filter placed over the photodetector(s) 64. As previously noted, an LED wavelength or wavelength range, and therefore a filter range, may be chosen to coincide with an oxygen absorption band in the atmosphere, to decrease solar irradiance at this wavelength. As previously noted, the 940 nm±25 nm band is a preferable range for this purpose.

As with the light emitters 50, an opening 91 in the detection surface 58 may also be provided above each photodetector 64. The narrow band filter 102 may be installed in, above, or beneath this opening 91.

The entire housing 56, and especially the detection surface 58, may be masked off with opaque white vinyl. This masking restricts the field of view of the photodetector(s) 64 so they only see the area of interest directly above the plate, reducing ambient light effects, and also preventing activity near the plate, like the batter shifting his stance or the catcher moving his glove near the plate, from causing a false trigger. The masking also ensures that the light beams 52 emerge from the slits 91 at a controlled width before diverging.

The ball must intersect two light beams 52 in order to measure speed (by the time gap between the peaks of the received scattered light signals, where each peak is found in the detected signal corresponding to the crossing of a respective light beam, and the distance between the beams), lateral position (by the ratio of the peak amplitudes detected by the photodetectors), and vertical position (by the ratio of the second measurement width to the gap between the measurements).

A microcomputer or processor 78, preferably in the form of FPGA (Field-Programmable Gate Array), is embedded in the housing 56 to process data and to perform necessary computations as will be presented in the following paragraphs. This FPGA may more specifically be a Spartan-6 FPGA module. An FPGA will be assumed hereinafter, although those of skill in the art will be able to adapt the following disclosures to other microcomputers or processors.

Optical signal processing electronics (also referred to herein as an optical receiver or opto-receiver) 80 are embedded in the housing 56 in operative coupling between the photodetector(s) 64 and the FPGA 78 to support the functionality of the EHP 30. A possible configuration of the electronics of the opto-receiver 80 will be described further herein.

The EHP may be powered by a battery 82, or, alternatively, receive wired power. For battery-powered embodiments, a lithium-iron-phosphate (LiPo) module is preferable to lithium-ion or other common batteries because of its high safety factor, high charge-cycle lifetime, and low cost. A charge management board may be integrated into the battery module, and allow the system to be used much like a laptop which can operate while charging and continue operation uninterrupted if abruptly disconnected from the charger. In such a configuration, the plate can run for approximately six hours unplugged.

Figure 4:
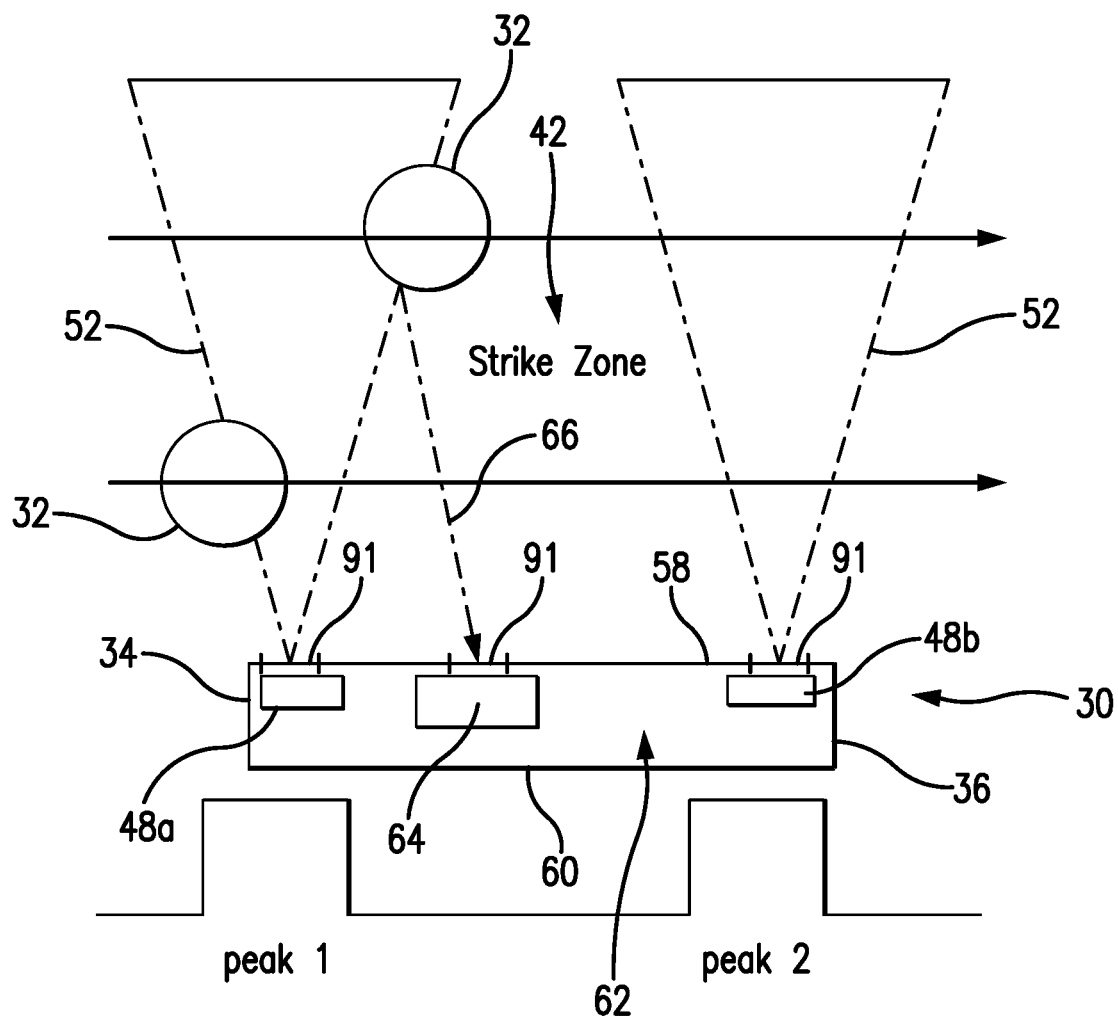
FIG. 4 is a diagram illustrating schematically diverging light beams extending from the electronic home plate with a ball passing over the electronic home plate at different heights, according to an embodiment of the present invention.

Each light beam 52 of the light emitters 50 (as best shown in FIG. 4) is a cone-shaped diverging beam which has a cross section varying in a vertical direction away from the upper member 58 of the housing 56. As previously noted, the beams are not of constant intensity, but are formed from discrete pulses of light; however, the rapid speed of the pulses will ensure that a ball 32 travelling at standard pitching velocities will intersect numerous such pulses from either light emitter set 48 as it crosses the plate.

During the game, upon the pitch being delivered, if the ball 32 passes through the strike zone 42, then indication will be activated indicating that the pitch is a "strike."

Figure 3:
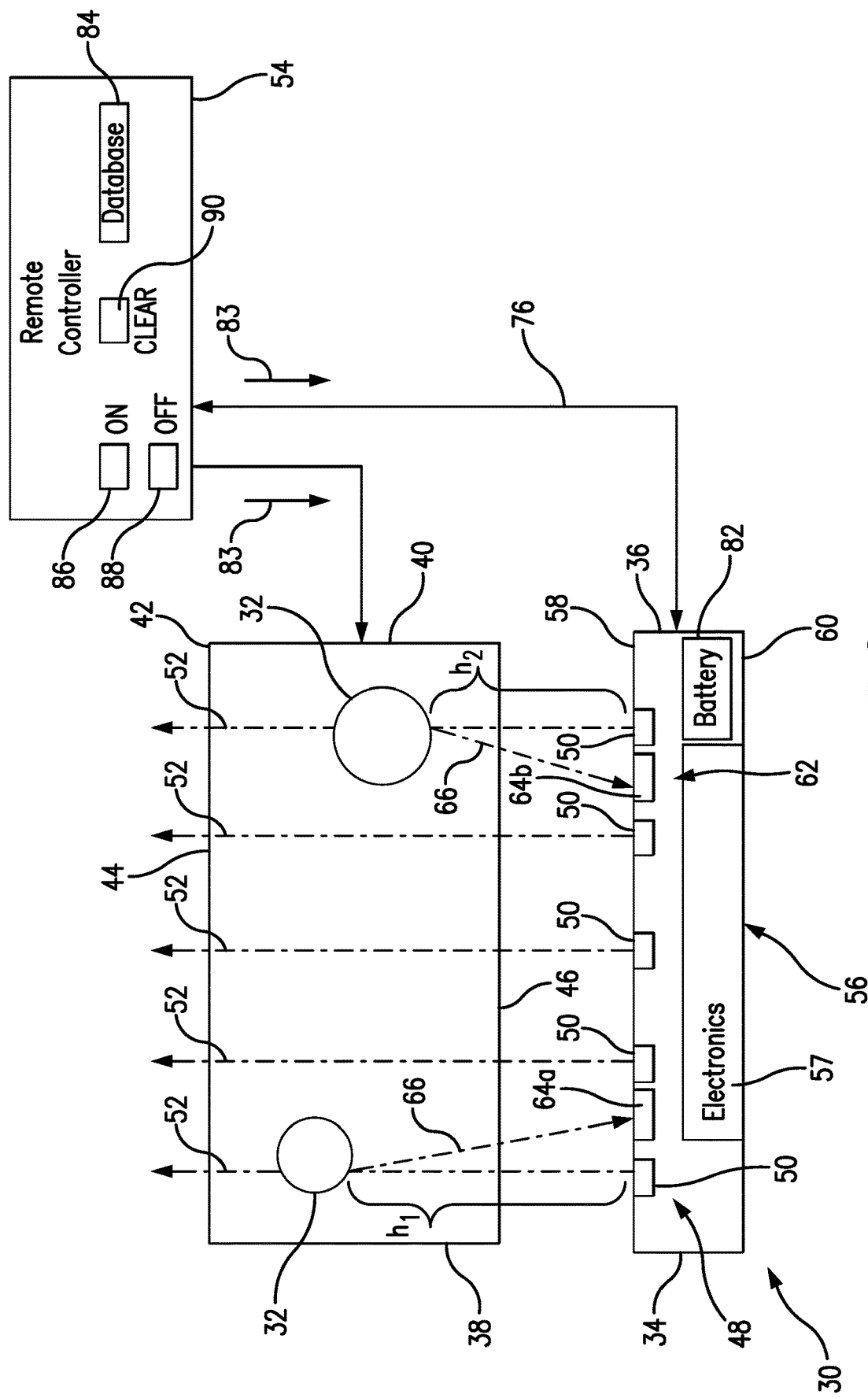
FIG. 3 is a schematic representation of the electronic home plate with light beams extending vertically from a detection surface, according to an embodiment of the present invention.

More specifically, when the ball 32 passes through the strike zone 42, it intersects light beams 52 from the first and second light emitter sets 48a, 48b, as shown in FIGS. 3 and 4. The interaction of the baseball surface with the light beams 52 causes the scattering of the light reflected from the surface of the baseball in multiple directions from the point where the light beam 52 and the baseball 32 intersect.

The detection of the scattered (reflected) light 66 at the photodetectors(s) 64, under certain conditions, activates the indicator system 68 which indicates that a "strike" has been detected. In order to declare a "strike", two positional conditions are to be met:

(a) horizontal: the baseball has to pass and be detected over the home plate between its side edges 34, 36, and (b) vertical: the height of the passing ball has to fall between the top and bottom boundaries 44, 46 of the strike zone 42.

Figure 5:
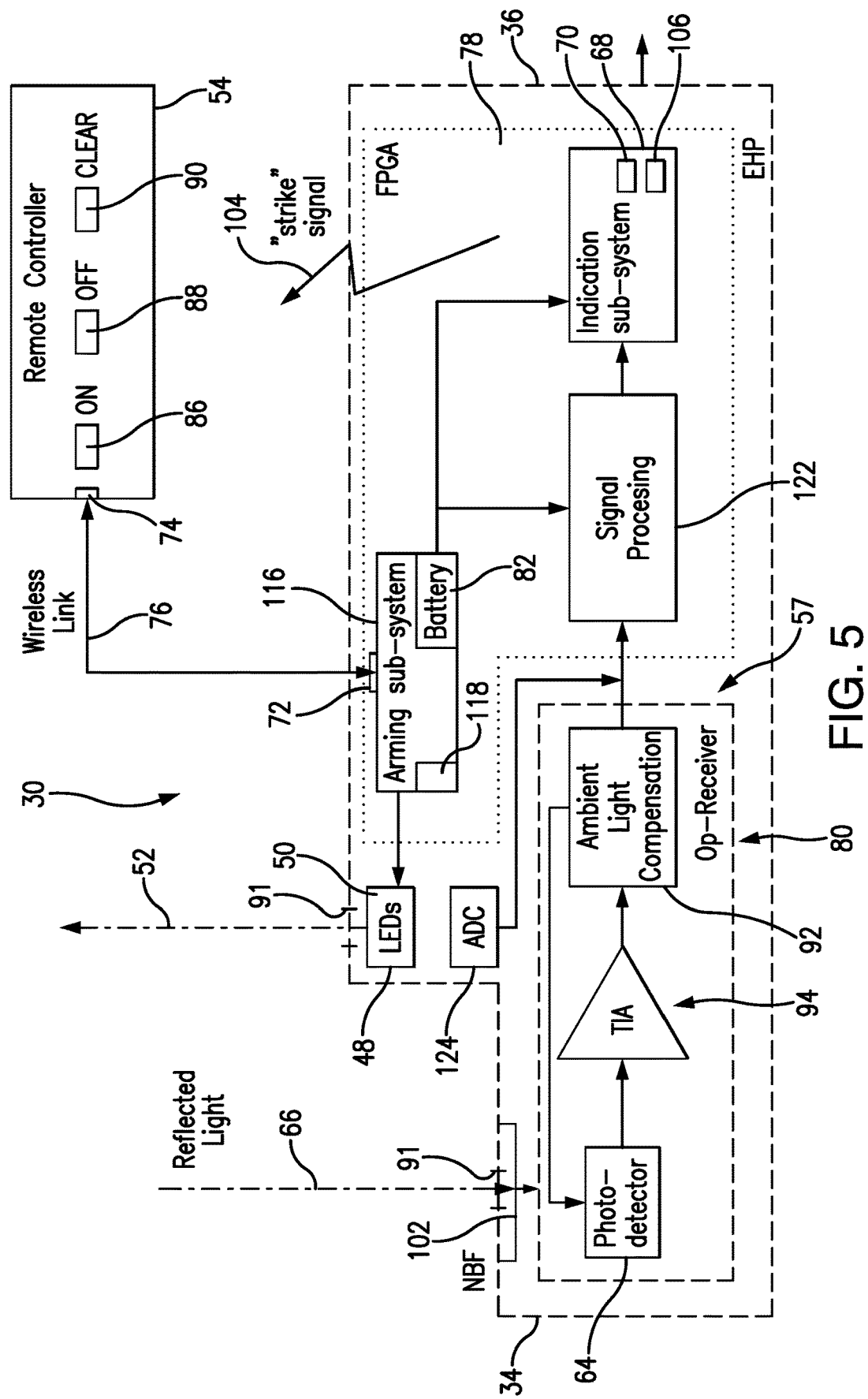
FIG. 5 is a schematic representation of key components of the electronics embedded into the electronic home plate, according to an embodiment of the present invention.
Figure 6A:
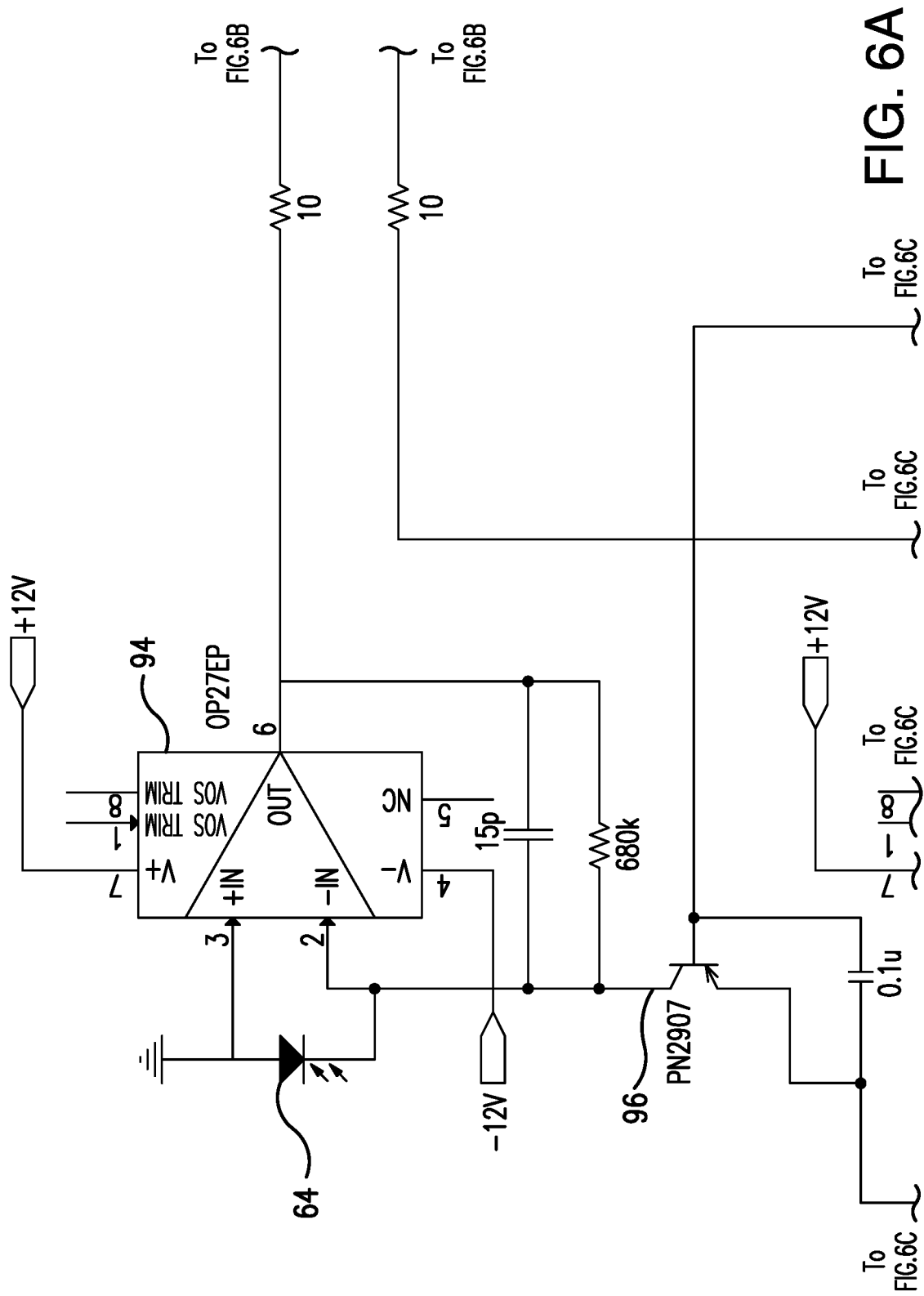
FIGS. 6A-6D are schematic diagrams of a subset of the circuitry of the electronic home plate, according to an embodiment of the present invention.
Figure 6B:
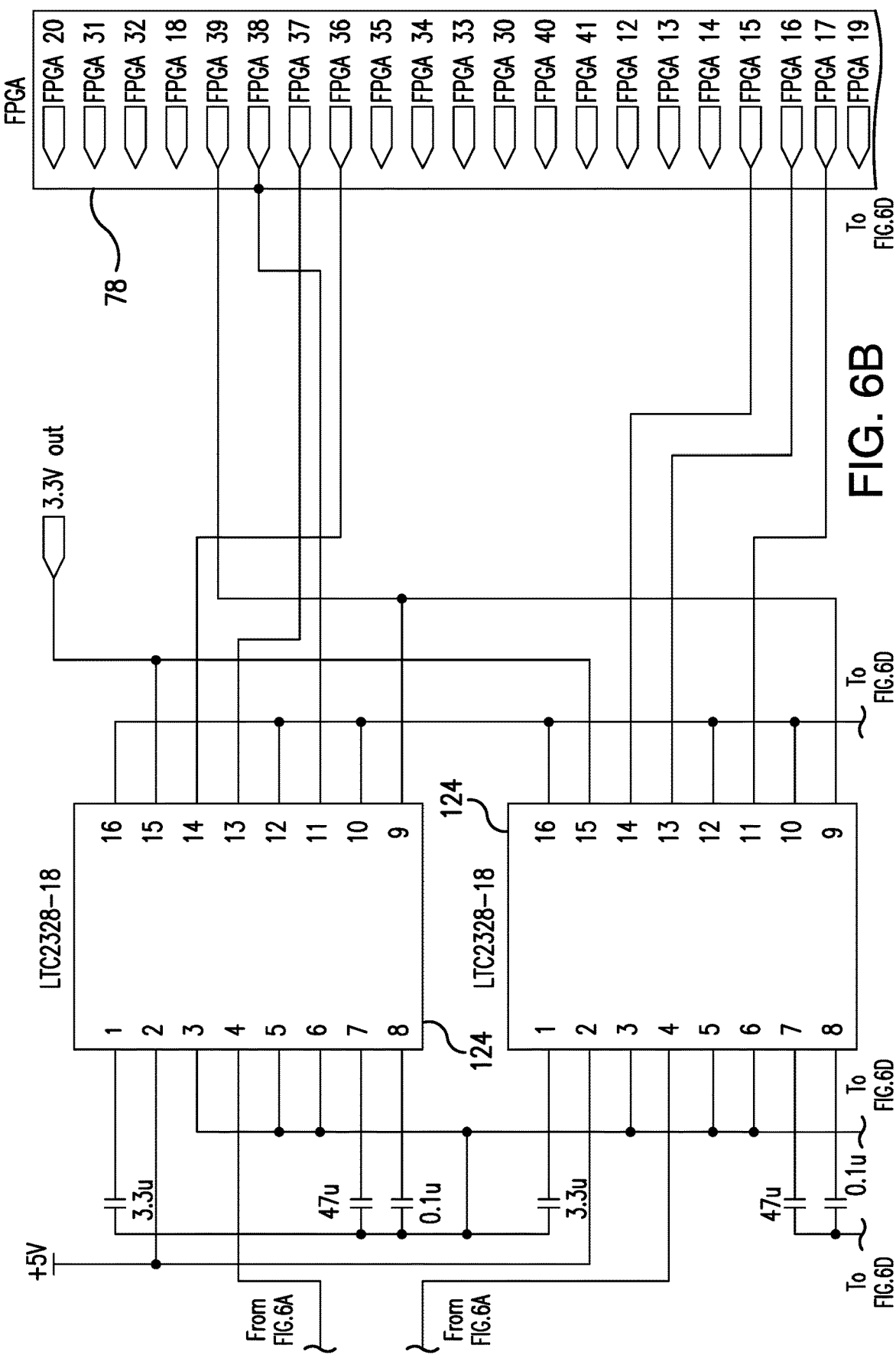
Figure 6C:
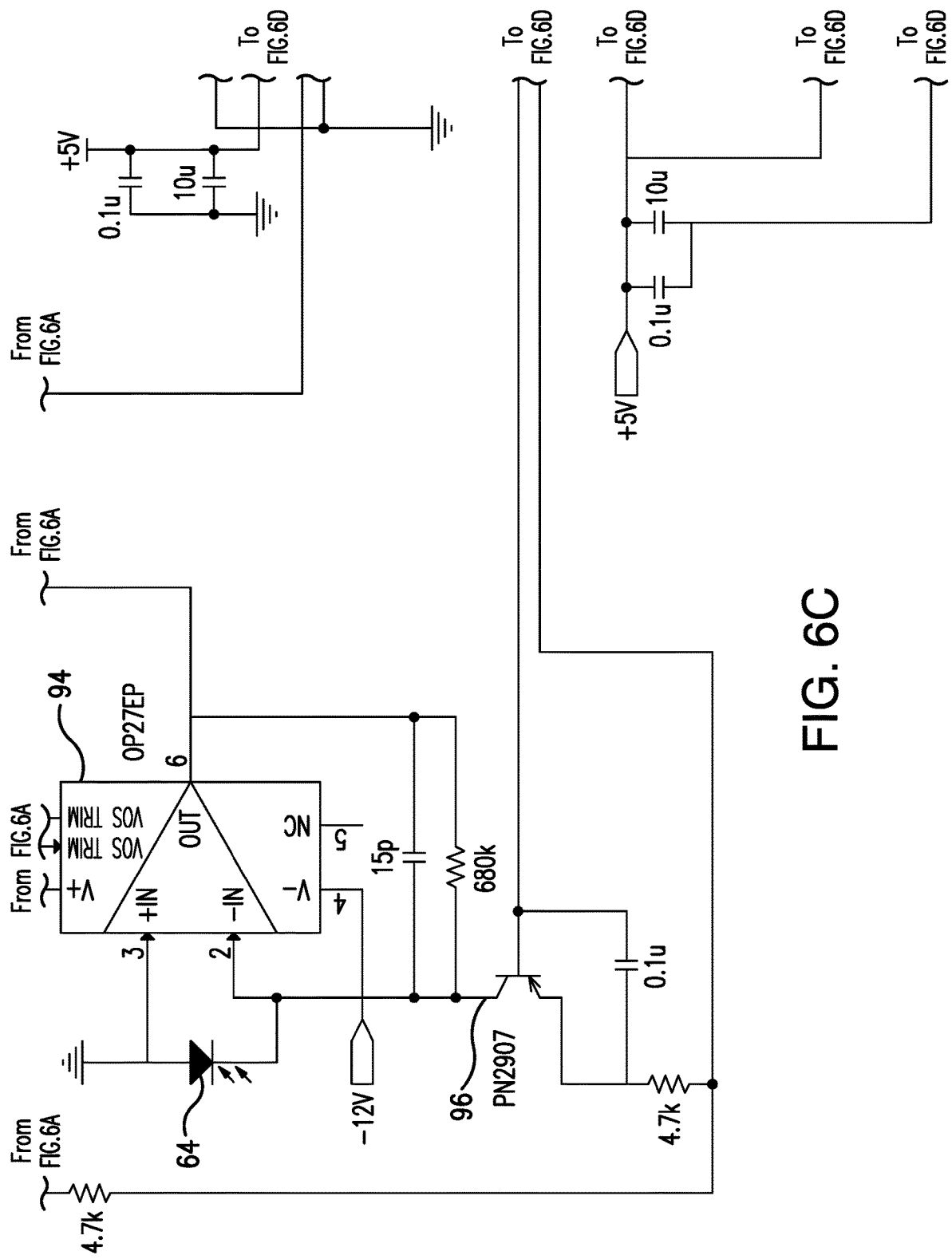
Figure 6D:
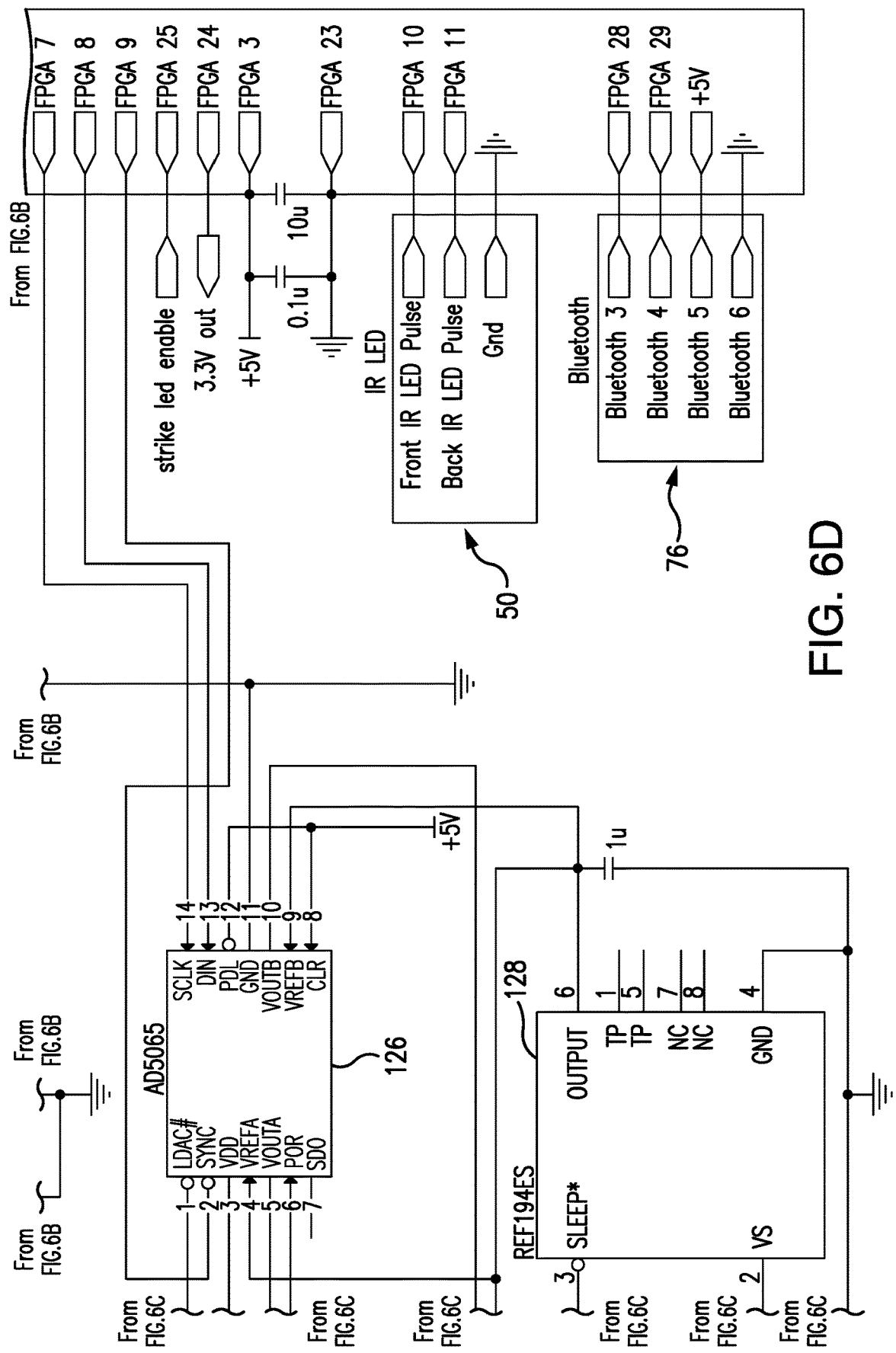

The indication system 68 in the EHP 30 is contemplated in a number of formats. For example, one or more visible light emitting diodes 70 (distinct from the light emitters 50, which preferably emit near-infrared or other light outside the visible spectrum) may illuminate after a "strike" is detected, alerting the umpire. Alternatively, wireless signals may be transmitted from the EHP 30 to a remote controller unit 54 of the official umpiring the baseball game. In addition, the "strike" indicator may be in the form of an audio signal 106 (as shown in FIG. 5) produced in the EHP 30. It is also contemplated that a cell phone application may be provided to permit cell phone users to see how the pitch qualified ("strike" or "ball") and the location/speed of the pitch.

Wireless communication is contemplated between the EHP 30 and officials of the game (such as umpire, scorekeeper, etc.). For this purpose, the official(s) is (are) provided with a remote controller sub-system 54 facilitating control commands and information exchanges with the EHP 30, as well as game results and statistics recordation. The official may use a cell phone/tablet/laptop/desktop as a remote controller 54, or to communicate information between the remote controller 54 and the EHP 30.

In order to provide wireless communication between the EHP 30 and the remote controller unit 54 in possession of the umpire, a transceiver 72 is embedded in the EHP housing 56, and a transceiver 74 is included in the controller unit 54 to communicate commands and data there between through a communication channel 76. The transceivers may be implemented, for example, as wireless transceiver used in Zigbee or Bluetooth radio.

Figure 2:
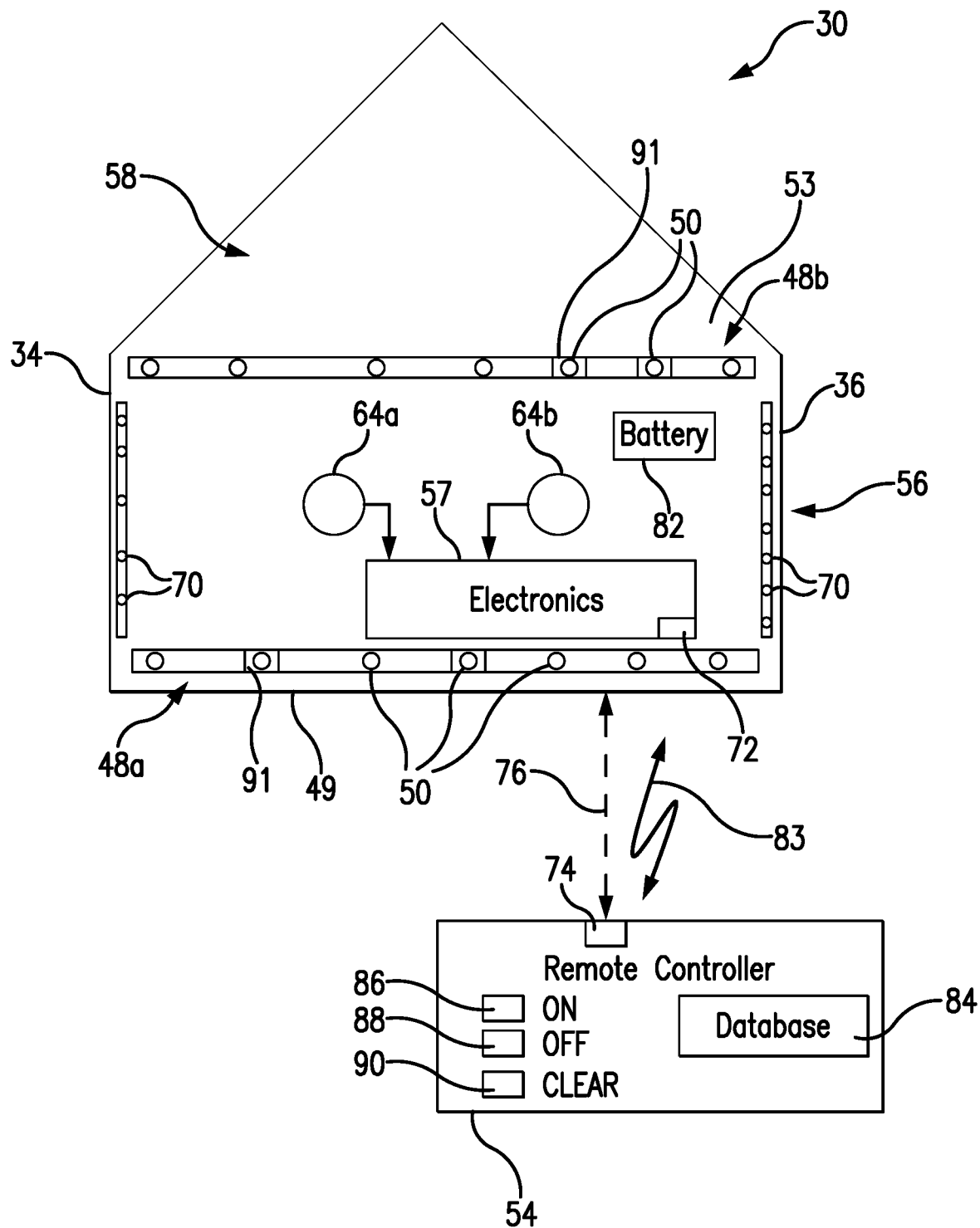
FIG. 2 is a schematic representation of an electronic home plate layout and wireless connection to a remote controller unit, according to an embodiment of the present invention.

As shown in FIGS. 2, 3, and 5, the remote controller unit 54 is provided with the "ON", "OFF", and "CLEAR" buttons 86, 88, and 90, respectively. A scorekeeper, or a person of similar authority, actuates the ON button 86 provided on the controller unit 54 in order to activate ("arm") the home plate 30 prior to each pitch delivered. Likewise, the scorekeeper deactivates ("disarms") the home plate 30 after each pitch or, if more convenient, after the batter leaves the plate due to either striking out or hitting the ball, by actuating the OFF button 88.

An arming sub-system 116 (shown in FIG. 5), upon receipt of the ON command from the remote controller, is activated, and, in turn, activates the FPGA 78 and light emitters 50 (which "idle" until the ON signal is received thereat from the remote controller). The arming sub-system 116 likewise deactivates the FPGA 78 and light emitters 50, and then itself, upon receipt of the OFF command. The photoreceiver (photodetector) 64 may in some embodiments be active constantly regardless of the state of the arming sub-system 116, although it will be ignored by the inactive FPGA 78.

While the electronic home plate 30 is ON, any movement across the home plate will be detected by the photodetector(s) 64 and produce a signal indicating a lateral strike. In order to prevent a false "strike" signal, the umpire activates the EHP 30 immediately prior to the delivery of the pitch, thereby preventing alerts from random motions over the home plate, such as the batter taking position or making practice bat swings. Additionally, power is conserved as various sub-systems, such as the light emitters 50, may be left in an inactive or idle state until needed.

When a strike is indicated by the indication subsystem 68, the official may actuate the CLEAR button 90 to re-set the indication subsystem 68. For instance, in embodiments where the indication subsystem 68 activates visible light emitting diodes 70, the CLEAR button 90 turns off the visible light emitting diodes 70. Similar deactivations may be applied to other indicators as needed. In some embodiments, the CLEAR button 90 may additionally perform all functions of the OFF button 88.

The arming sub-system 116 may have an LED power supply 118 and a wireless connection/controller (transceiver 72) with the remote controller 54. In some embodiments other than those depicted, the EHP 30 may also, or alternatively, allow for a cabled connection with the remote controller 54 or other exterior systems and have an Ethernet port or similar, and the arming sub-system 116 may therefore have a wired controller coupled to the Ethernet port.

The arming sub-system 116, along with the indication sub-system 68 and signal processing algorithm 122, are contemplated as parts of the FPGA module 78.

Prior to beginning of the game, the umpire (or another game official) is provided with the ability to remotely adjust the strike zone parameters (for instance, by selecting a jersey number of the player) that activates an indication once the baseball is in the vertical strike zone, i.e. that the detected height at which the baseball crosses the light beams 52 falls between the top and the bottom boundaries 44, 46 of the strike zone 42.

In operation, the umpire (or other game official) sends a wireless signal 83 through the communication channel from the controller unit 54 to the EHP 30 to provide the operations 78 with parameters of the strike zone corresponding to a particular height of a next batter (batter of interest) in the game.

A database 84 of the strike zone parameters is available to the umpire (or other game official). The database 84 may reside in the remote controller 54, or in another computer or memory which is connected thereto. Preferably, prior to a season, all eligible players have their strike zones measured; these measurements are stored in the database 84. Before the pitch, the umpire (or scorekeeper) actuates the remote controller to select from the database 84 the jersey number of the current player of interest (that is, the current batter). The parameters (top and bottom boundaries) of the strike zone corresponding to the jersey numbers of all players in the game may have been transmitted to the EHP 30, and particularly to the FPGA 78, for storage before the game, or may be transmitted individually as each player becomes of interest. The parameters are then used for computations as will be presented in detail further herein. The FPGA 78 preferably does not keep this information after the game is completed, to conserve storage, and as the players of interest can be expected to vary from game to game.

In order to attain a precise detection of the ball position relative to the boundaries of the strike zone, an important design consideration is to provide the amount of scattered light 66 from a baseball 32 intersecting a light beam 52 which can be easily detectable by the photodetectors 64 even in ambient light conditions.

If the power of a light emitter 50 is P (W), and the baseball intersects a fraction f of a light beam 52 from the light emitter 50, then the light scattered is described as fW, which likely corresponds to the Lambertian distribution over a hemisphere.

If a photodetector 64 (that is, a photoreceiver) has a collection area A, the power detected from a baseball crossing the light beams 50 at a height of h (m) (for example, h1 or h2 as shown in FIG. 3) is $$P_{RX} = \frac{fPA}{2\pi h^2} \tag{Eq. 1}$$

The present system is designed so that any baseball passing over the strike zone 42 intersects one or more light beams 52. For example, for a 1 mW emitter and a photodetector collection area of 100 mm$^2$, where f=100% and h=1 m, the received power is approximately 16 nW. This signal may be detected as a pulse of electrical photocurrent whose length depends on the speed of the baseball and its diameter (~74 mm).

As an extreme example, a 100 mph fastball would result in the photodetector emitting a photocurrent pulse length of approximately 1.7 ms. Therefore the detection bandwidth of the photodetector needs to be on the order of 10 kHz.

Typical photodetectors have a noise equivalent power on the order of $10^{-13}$ W/$\sqrt{Hz}$, and thus are capable of detecting $10^{11}$ W in a bandwidth of 10 kHz. These considerations provide a signal-to-noise ratio for the example calculations of 1600, and establishes the feasibility of the proposed scheme.

The optical sensors and amplifiers of the photodetectors 64 can detect the reflected emitter light in the presence of bright sunlight or baseball park night lights.

To avoid problems with possible direct sunlight incident on the EHP detection surface 58, it is contemplated that the optical receiver 80 includes an ambient light compensation circuit 92 that will offset the photocurrent generated in the photodetectors by sun exposure, which is several orders of magnitude higher than the signal corresponding to the scattered light 66 reflected from the baseball passing over the EHP. A more detailed embodiment of this ambient light compensation circuit 92 will be described further herein.

The opto-receiver 80 preferably also includes an optical receiver circuit, which is preferably a transimpedance amplifier (TIA) circuit 94, due to moderate gain-bandwidth product, low input bias current and offset voltage, and rail-to-rail power supply range. For purposes of clarity, the optical receiver circuit 94 will be referred to as a TIA circuit, or TIA, in the following paragraphs and in the figures, although those of skill in the art will be able to substitute other circuits with similar characteristics.

The TIA circuit 94, or another converter circuit, also converts the photocurrent to a voltage, which can then be further converted from analog to digital by an analog-to-digital converter (ADC) 124 for processing by the FPGA 78 or other processor. This ADC 124 may be a 1 MSps ADC.

A schematic of a subset of the electronics 57 of the EHP 30 is depicted in FIGS. 6A-6D according to one embodiment. This particular embodiment contemplates two photodetectors 64, which are coupled to separate TIAs 94 and ADCs 124. The ambient light compensation circuit 92 takes the form of separate PNP transistors 96 for each photodetector and a digital-to-analog converter (DAC) 126 taking input from the FPGA 78 and a volt reference 128.

Figure 7:
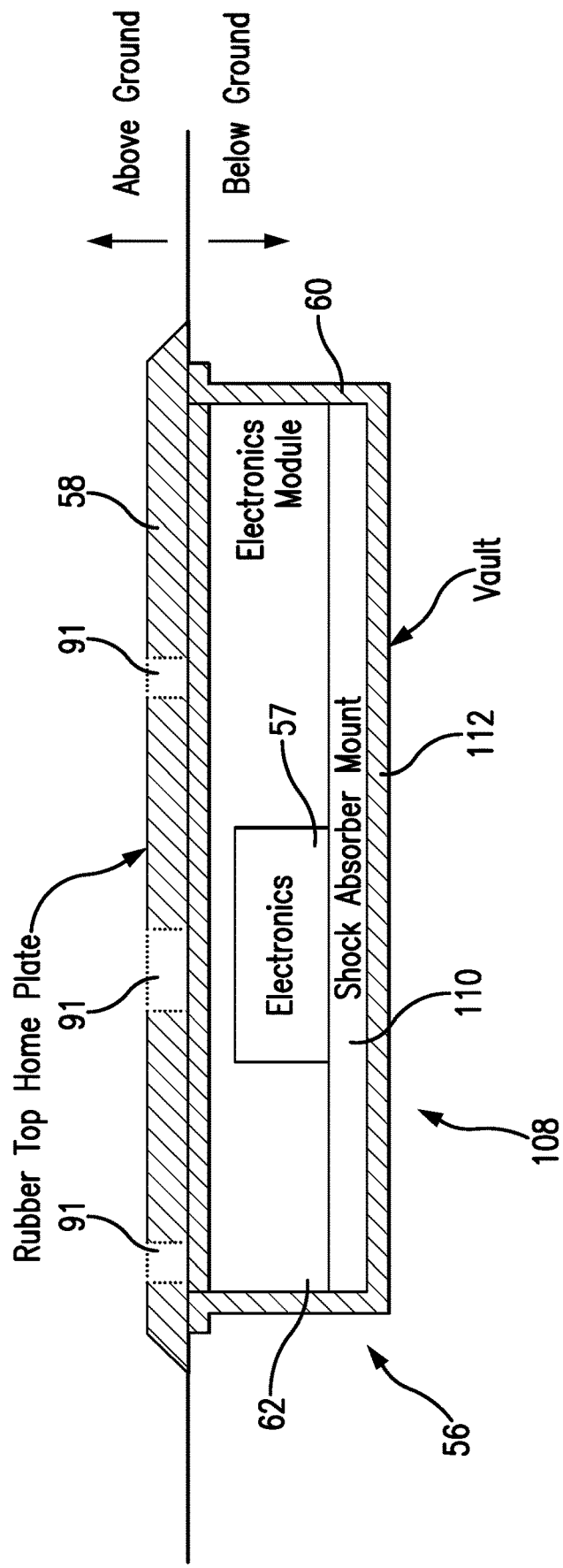
FIG. 7 is a schematic representation of the housing of the electronic home plate provided with a shock absorbing mechanism, according to an embodiment of the present invention.

Referring to FIG. 7, the EHP electronics 57, light emitters 50, and photodetectors 64 may be housed behind small windows (within slits or openings 91) that are flush with the upper member (that is, the detection surface) 58 of the EHP housing 56. The windows may be transparent primarily or only to light of the range emitted by the light emitters 50, to better block ambient light; when the light emitters 50 emit only non-visible light such as infrared, the upper member 58 may be visibly opaque. The components beneath the upper member 58 are mounted within the bottom module 60.

A shock absorbing mechanism 108 is provided in the housing 56 to withstand mechanical stress and shocks from balls, bats, and players hitting the EHP 30. Shock absorption is carried out through forming the bottom module 60 as a removable module housing the electronics in the space 62. The removable bottom module 60 is plugged through a shock absorber mount 110 into a resin vault 112 mounted in the ground. The stress will be directed around the electronics and optics into the ground. The rubber top member 58 is attached to the module 60.

It is envisioned that the housing 56 of the EHP 30 has the dimensions of a standard sized baseball home plate, except for the thickness, which will be defined by the dimensions of the space 62 in the bottom module 60 to accommodate all the necessary electronics 57 to detect and indicate the presence of a baseball passing over the home plate through the strike zone.

In fabrication of the subject electronic home plate, a mold may be manufactured similar to the conventional home plate except it is thicker with indentations in the upper member 58. The light emitting diodes 50 with lenses are snapped into the indentations made in the upper member 58, the indentations then serving as the aforementioned slits 91. One or more photoreceivers (photodetectors 64), electronic components 57, and a battery 82 are assembled in the removable bottom module 60 which subsequently will be attached to the upper member 68. Alternatively, the photodetectors 64, electronic components 57, and battery 82 may be attached to the bottom module 60.

The light emitters 50 and photodetectors 64 must operate in the presence of rain, dust and mud. This may require the umpire to clean the detection surface 58 of the EHP 30 periodically, which is already done by the umpire on standard prior art home plates.

As shown in FIG. 5, the scattered light 66 from a baseball reaches the photodetector(s) 64 via a narrow band filter (NBF) 102. The umpire "arms" the strike indication sub-system 68 by the remote controller 54 via the wireless link 76.

An optical pulse corresponding to the determination of a strike triggers the illumination of the LED strike indicator lights 70. The indicator LEDs 70 in the indicator sub-system 68 may be in the form of LED tape strips attached to the upper member 58 of the housing, for example at the side edges of the plate, as shown in FIG. 2. Alternatively or in addition, other forms of strike indication are contemplated, such as, for example, a wireless signal 104 or an audio signal 106.

Figure 8A:
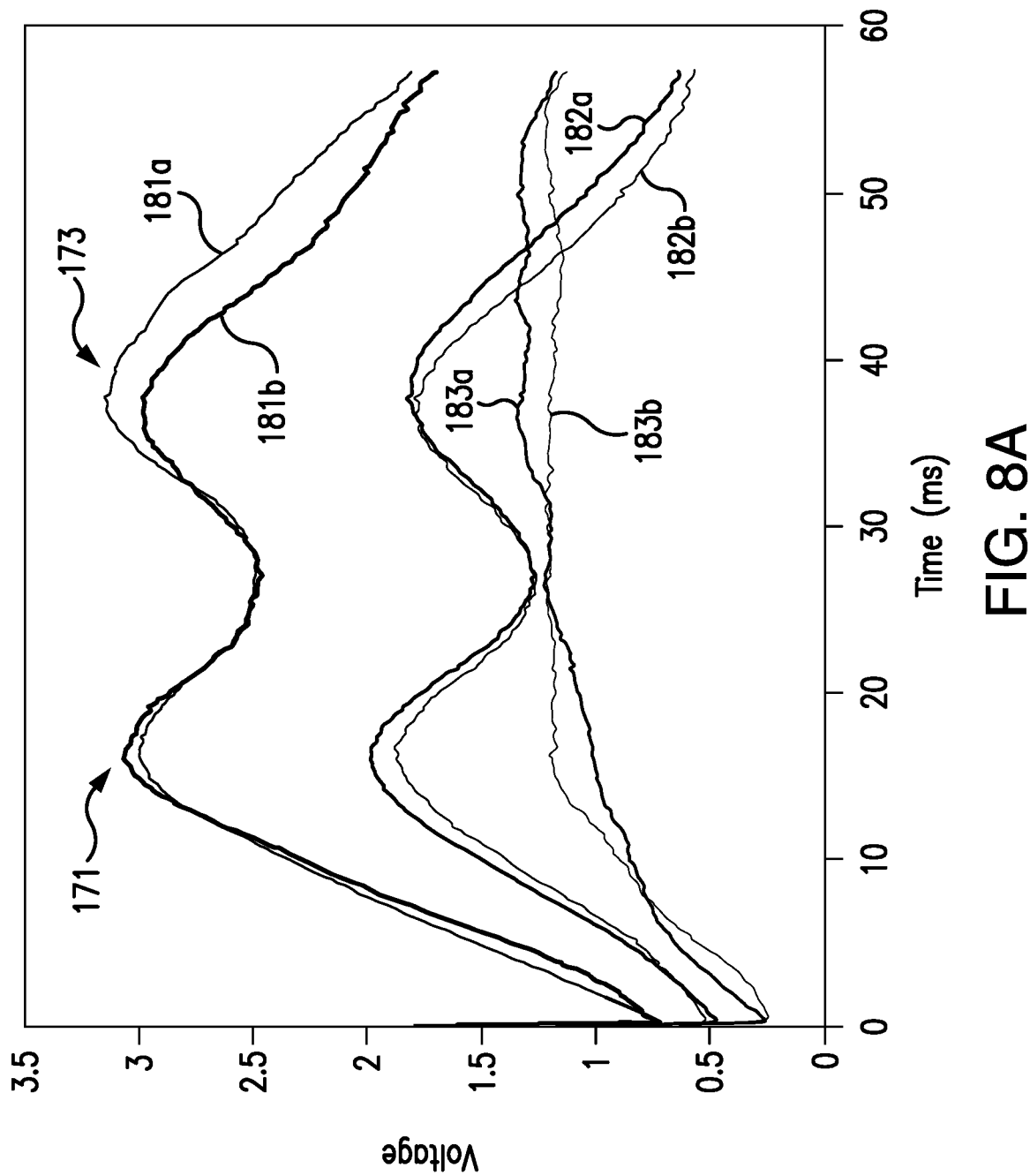
FIGS. 8A and 8B are voltage-over-time graphs expressing the output of photodetectors and corresponding optical receivers, with and without light fluctuation compensation, of two embodiments of the present invention.

The scattered light signals 66, when detected by the photodetector(s) 64, form two consecutive "peaks" of photocurrent amplitude. Due to the discretely pulsed nature of the light beams 52, the scattered light signals 66 are also discrete and the resulting photocurrent is produced in discrete pulses, which may be treated as a series of data points. FIG. 8A depicts an example output graph of the data points of two photodetectors 64a, 64b, with the amplitude of the outputted photocurrents (converted to voltage by the TIA 94) graphed on the Y axis and time graphed on the X axis.

A first peak 171, visible in the data points generated from both photodetectors 64, corresponds to the crossing of light beams 52 emitted from the first light emitter set 48a, and a second peak 173 corresponds to the crossing of light beams 52 emitted from the second light emitter set 48b.

A curve-fitting algorithm, for instance a nonlinear Levenberg-Marquadt curve fitting algorithm, may be employed to fit the data points resulting from each individual pulse of the light emitters 50 to a curve as appropriate. Features of the peaks such as time, amplitude, and width may be more easily computed from a curve. Additionally, fitting the data to a curve will reduce the effects of outlier data points caused by unexpected disturbances. The data points representing the photocurrent of each photodetector 64, converted to voltage by the corresponding TIA 94 or other converter circuit, may each be fit to a different curve; for instance, as can be seen in FIG. 8A, separate curves 181a and 181b are generated for the outputs of each of two photodetectors, each curve being a double Gaussian distribution.

In the measured outputs of the example of FIG. 8A, the two photocurrents (voltages) 181a and 181b are roughly equal and strongly aligned at the first peak 171, indicating that the ball 32 intersected the light beams 52 from the first light emitter set 48a at a roughly equal distance from each photodetector; if the photodetectors 64a and 64b are equally spaced from the center of the EHP 30, this indicates that the ball 32 crossed the first light emitter set 48a at an approximate center of the EHP 30. At the second peak 173, the first photocurrent 181a is stronger in amplitude, indicating that the ball 32 was closer to the corresponding photodetector 64a than the photodetector 64b of the second photocurrent 181b when it crossed the second light emitter set 48b, thereby providing more reflected light to the first photodetector 64a.

The height of the ball 32 as it crosses each light emitter set 48, meanwhile, is determined by the widths of the corresponding peaks, normalized to the ball speed (defined as the time between the two peaks). A ball crossing the light beams 52 at a greater height, where, as previously noted, the light beams 52 are broader due to divergence, will reflect more pulses of the light beams 52 before passing beyond them entirely.

Hereinafter, it will be assumed that the FPGA 78 computes "the" height of the ball as its height at the second emitter set 48b. However, other embodiments may compute the ball height at the first light emitter set 48a, or compute an average between the two heights.

The computations necessary to provide more exact measurements of height and lateral position will be described further herein.

Figure 8B:
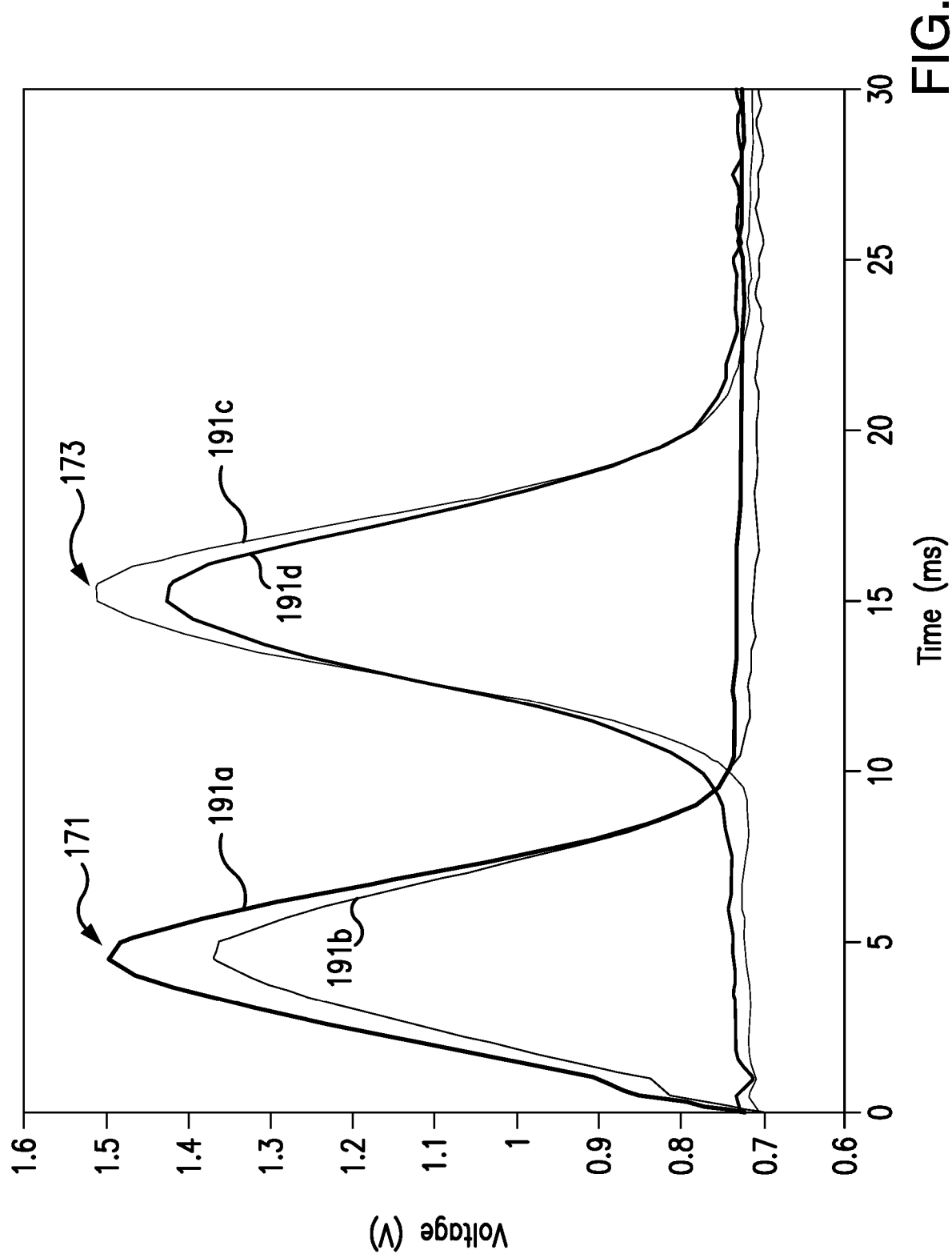

In an embodiment where the first and second light emitter sets 48a, 48b pulse in an alternating pattern, the exact timing of the receipt of a specific scattered light signal may be compared to the timing of the pulses of each light emitter set 48 to further assist in determining whether a given data point is of the first or second peak. An example output graph of two photodetectors of such an embodiment is depicted in FIG. 8B. In this example, four curves are generated, respectively representing the data points from each combination of source light emitter set and destination photodetector. Specifically, curve 191a fits the plurality of data points resulting from the pulses of the first (e.g. front) light emitter 48a being reflected into the first (e.g. left) photodetector 64a, curve 191b fits the plurality of data points resulting from the pulses of the first light emitter 48a being reflected into the second (e.g. right) photodetector 64b, curve 191c fits the plurality of data points resulting from the pulses of the second (e.g.

back) light emitter 48b being reflected into the first photodetector 64a, and curve 191d fits the plurality of data points resulting from the pulses of the second light emitter 48b being reflected into the second photodetector 64b.

It is noted that the data points depicted in FIG. 8B may be expected to fit to single Gaussian curves, not double Gaussian.

Figure 9:
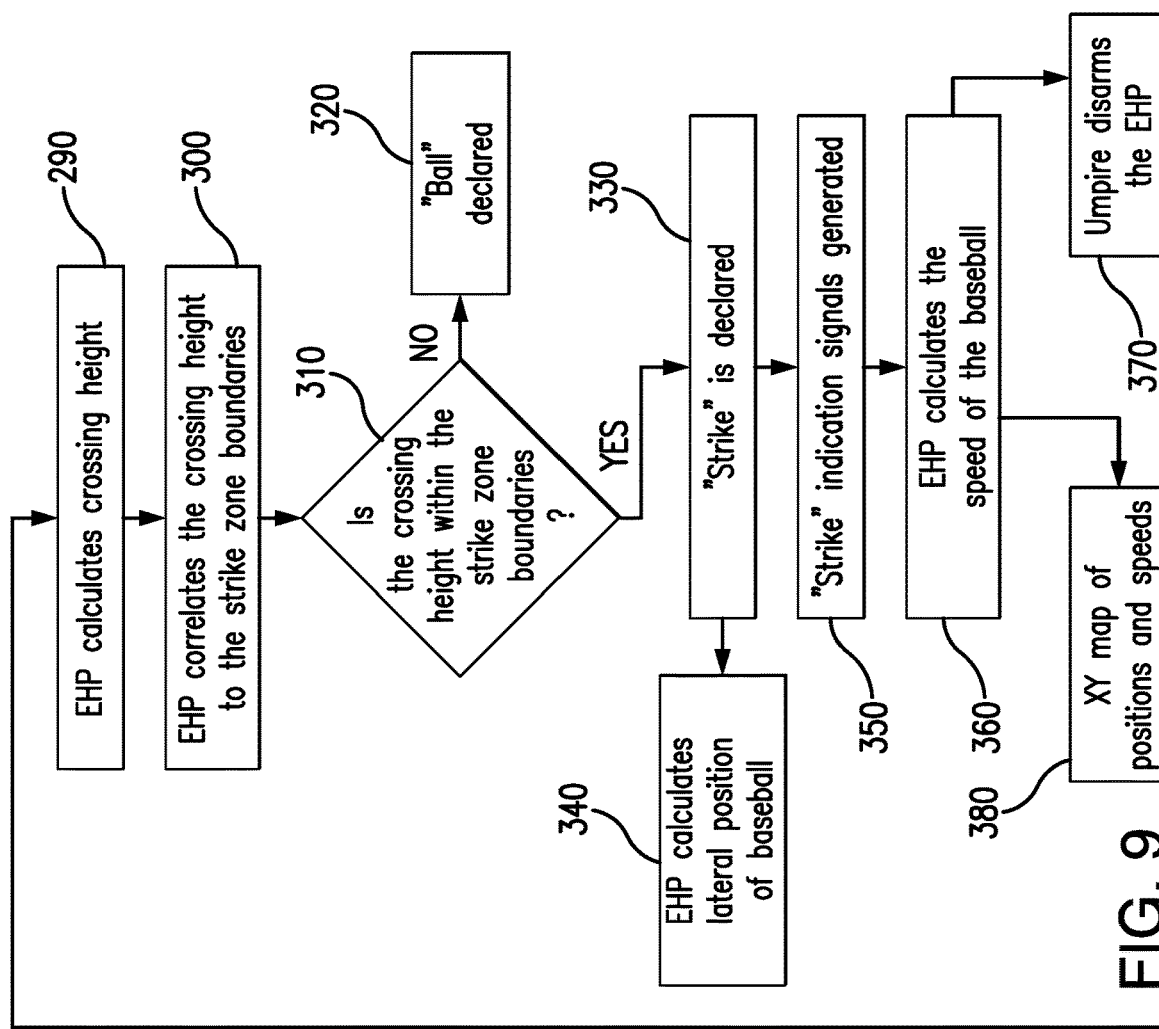
FIG. 9 is a flow chart diagram of a process for automatic determination of position and speed of baseball passing over the electronic home plate, according to an embodiment of the present invention.
Figure 9:
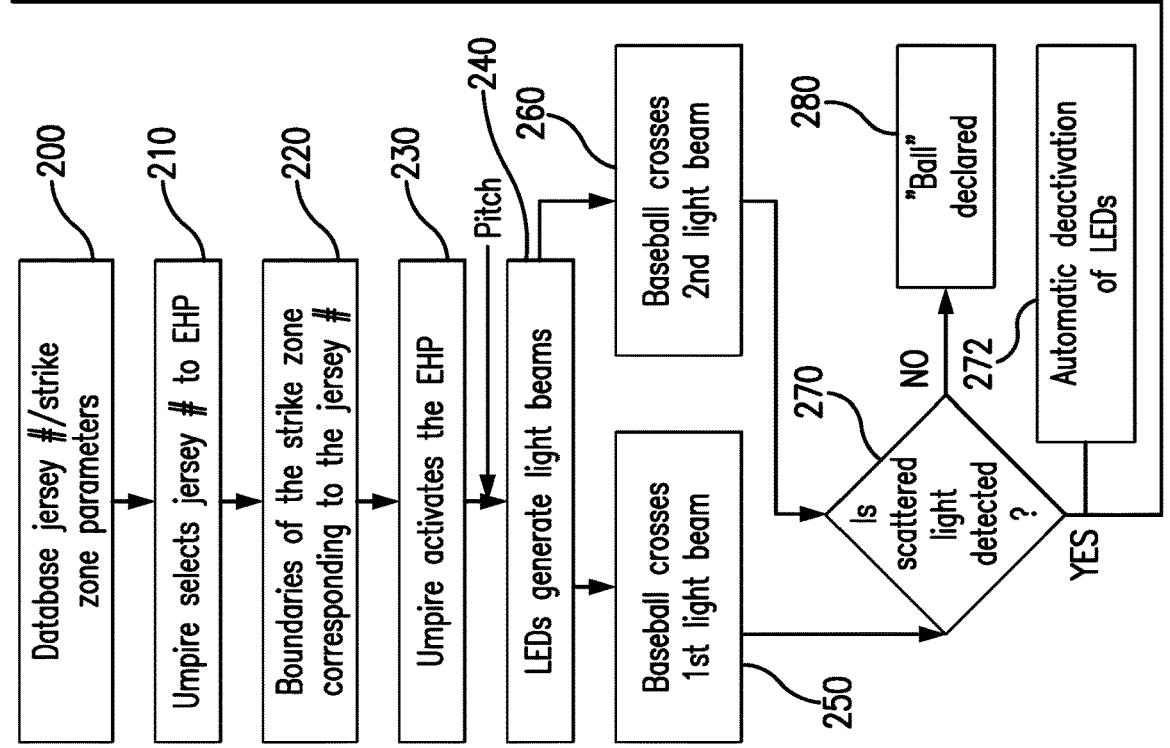

FIG. 9 is a flow chart diagram of the automatic determination of a "strike" provided by the underlying functionality of an electronic home plate, according to an embodiment of the present invention. Certain operations may employ the input of a human being, who for the purposes of this description will be assumed to be an umpire, although any human or humans may provide the necessary input, and indeed embodiments where some or all of the input is generated and supplied automatically may be envisaged.

The process is initiated in block 200 where the umpire uses the remote controller 54 to open the database 84 of all eligible players, and selects a jersey number of a batter of interest from the database 84 in block 210. Subsequently, the umpire transmits the strike zone parameters of the batter of interest to the EHP 30 in block 220. As an alternative, the strike zone parameters of all batters in the game may already be stored in the EHP 30, and selection of the jersey number only transmits the jersey number, whereupon the FPGA 78 calls up the correct strike zone parameters from storage. As another alternative, the umpire may begin in block 220 and input strike zone parameters directly into the remote controller 54, if those parameters are known to the umpire.

Subsequently, in block 230, the umpire actuates the ON switch on the remote controller 54 in order to activate (arm) the EHP 30 just before the pitch is delivered.

The activated processor 78, which in the embodiment depicted in FIG. 5 is an FPGA, turns on the light emitters 50 of the light emitter sets 48 in block 240 and "waits" for the receipt of a first scattered light signal in a photodetector 64.

The pitched ball 32 passes over the EHP 30 and crosses (that is, intersects) one light beam 52 in block 250 at a corresponding crossing height. In addition, the baseball may cross another light beam 52 in block 260. The light reflected from the surface of the baseball crossing the light beams 52 is scattered and is incident on the surface of the photodetector(s) 64, so that the photodetectors 64 detect the scattered light and produce an electrical photocurrent corresponding to the optical signal incident on the photodetector 64.

The logic further flows to block 270 to determine if the scattered light was detected. If the scattered light was not detected at this time, the logic flows to block 280 where a "ball" is declared, meaning that the delivered pitch did not result in the baseball passing over the home plate between the lateral boundaries 38 and 40 of the strike zone.

If, however, in logical block 270, it was determined that the scattered light was detected (the indication of the "lateral" strike), the logic flows to block 290 where the FPGA 78 calculates the crossing height of the baseball.

The height of a pitch is determined as shown schematically in FIGS. 3-5. The LEDs 50 produce a "picket fence" or "curtain" of discretely pulsing light beams 52 whose width varies as a function of height. A ball 32 that passes through the cone-shaped beams 52 produces a series of scattered light signals 66 over time, where more signals are produced for balls at greater heights, normalizing for ball speed. The FPGA 78 makes the computations based on readings of the photodetector(s) 64 corresponding to crossing of two beams (from the first and second light emitter sets 48a, 48b) by the ball 32.

From block 290, the logic passes to block 300 where the FPGA 78 correlates the calculated crossing height to the boundaries of the strike zone, specifically to the top and bottom boundaries 44, 46 of the strike zone, as set in block 220.

Information further passes to logical block 310 where a determination is made whether the calculated crossing height falls between the strike zone's top and bottom boundaries 44, 46. If the calculated height(s) is (are) not inside the parameters of the strike zone, the logic flows to block 320, where a "ball" is declared.

If, however, in block 310 the calculated height is found between the top and bottom boundaries of the strike zone, a "strike" is declared in block 330, and the logic further flows to block 350 where the "strike" indication signal is generated.

In this instance, the indication system 68 actuates the "strike" signal, either in the form of visible lights, audio signal, wireless signal, and/or use of a cell app for cell users to see the results, etc., depending on the specific embodiment of the system. The light and/or audio signals are easily noticeable by the umpire (or other officials). A wireless "strike" signal may also, or alternatively, be transmitted from the transceiver 72 of the EHP to the transceiver 74 of the remote controller 54 to alert the umpire (or other official) that the pitch resulted in a "strike."

If at least two photodetectors 64 of known positions both receive scattered light signals, the logic may also calculate a lateral position of the baseball. This is not relevant to a "strike" determination, as the lateral qualifications of a strike are determined merely by whether the ball intersected the light beams 52 at all, but may be useful for training or other purposes. The lateral position is computed in block 340 by the signal processing software 122 (shown in FIG. 5) by the ratios at the peak amplitudes of the signals received by two (or more) photodetectors 64.

In order to calculate the speed of the baseball passing over the home plate, in block 360 the FPGA 78 calculates the speed of the baseball based on the time difference between detection of the first and second scattered light signals peaks as the ball crosses the first and second light beams in blocks 250 and 260. Specifically, when the ball passes through two light beams 52, the photodetector 64 "sees" two peaks, each resulting when the ball is directly above a light emitter set 48 and corresponding slit 91 (the latter shown in FIGS. 2, 4, 5, and 7). Since the spacing between the centers of the two slits 91 is known, in order to calculate the speed, the FPGA 78 divides this distance by the time between two signal peaks which is measured by a sampling ADC (Analog-Digital Converter) 124 (shown in FIGS. 5, 6, and 10). The peaks of the two signals of interest are defined by the FPGA code.

The exact speed may be useful for training or other purposes. Additionally, for reasons described above, the speed is used in the determination of the height of the ball in block 290. For this reason, in some embodiments it may be more convenient to perform the operations of block 360 before or simultaneously with block 290. However, for a height computation, the speed need not yet be converted to miles per hour or other traditional velocity measurement, but may be used in a more abstract "time between light signals" form, and converted at a later point, such as after block 330.

Upon the "strike" being determined and indication of the "strike" generated, the umpire actuates the OFF button 88 on the remote controller to deactivate the EHP in block 370 until the next pitch is delivered.

The light emitters 50 in the home plate may also be deactivated automatically, in block 272 or 370, either after the pitch is detected or after a set time period since the LEDs' activation, in order to minimize power consumption.

In addition, in block 380, the EHP can produce an XY map of positions and speeds of delivered pitches as a training aid tool.

Figure 10:
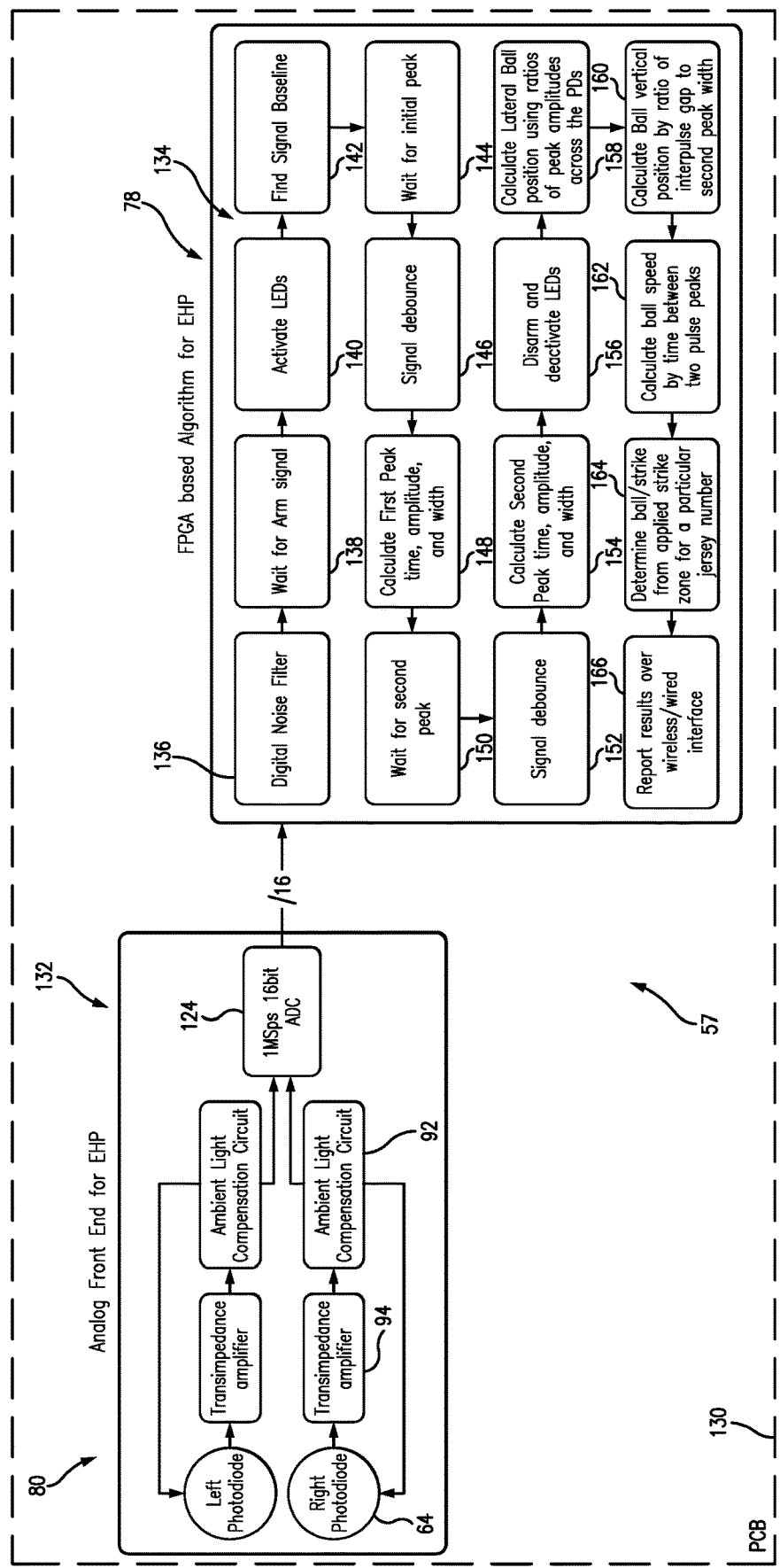
FIG. 10 is a representation of the Analog Front End and the FPGA based algorithm of the electronics embedded in the electronic home plate, according to an embodiment of the present invention.

Referring to FIG. 10, a PCB (Printed Circuit Board) 130 is schematically shown at which the FPGA 78, the ADC 124, and an analog front end 132 for the EHP 30 reside.

The analog front end 132 for the EHP 30 contains the photodetectors 64 supplying the output signal to the transimpedance amplifiers (TIAs) 94 followed by the ambient light compensation circuitry 92. From the output of the TIAs 94 (also shown in FIGS. 5 and 6A-6D), the signals are applied to the ADC 124 in analog form and are output by the ADC 124 in a digital format to the FPGA 78 which operates in correspondence with the algorithm 134.

As shown in FIG. 10, the FPGA applies a digital noise filter at block 136 to the signal(s) received from the analog front end 132. In subsequent block 138, the FPGA waits for the "Arm" signal, and activates LEDs (light emitters 50) in block 140 once the "Arm" (ON) signal is received from the remote controller 54 actuated by the umpire (or other game official).

Upon activation of the LEDs, in block 142 the FPGA 78 may determine a baseline voltage representing "on-pulse" conditions when some or all of the light emitters 50 are emitting a light pulse but the pitch has not yet occurred. These on-pulse conditions are reflective of scattered light signals resulting from the light beams 52 intersecting objects other than a ball, such as an overhanging backstop or the roof of an indoor stadium. The "on-pulse" voltage may then be considered when compensating for ambient conditions, either by itself or as a difference between average "on-pulse" and average "off-pulse" conditions. The FPGA 78 may also initialize and participate in ambient light compensation, which will be described further herein, specifically with reference to FIG. 11. The logic then flows to block 144 where the FPGA waits for the initial peak arrival.

Upon the initial peak of voltage being received, the logic flows to block 146 for optional signal debouncing and calculates the first peak time, amplitude, and width in block 148.

Upon calculation the parameters of the initial debounced signal in block 148, the logic flows to block 150 and waits for a second peak to arrive. When the second peak is received, the logic debounces the signal in block 152 and calculates the second peak time, amplitude, and width in block 154.

When both signals are processed in blocks 148 and 154, the FPGA 78 disarms and deactivates the LEDs 50 in block 156 in order to save battery power. The LEDs are only actuated when a pitch is imminent, and all computations are preferably performed with the LEDs deactivated.

From block 156, the logic follows to block 158 where the FPGA 78 computes a lateral ball position using ratios of the detected peak amplitudes (for two light beams crossings) across two (or more) photodetectors. The logic further calculates ball vertical position (height) in block 160 by the ratio of the inter-peak gap to the second peak width.

Further, in block 162, the FPGA 78 calculates ball speed by the time gap between two peaks and the distance between slits in the top member of the EHP housing corresponding to the two light beams being crossed.

From block 162, the algorithm passes to block 164 where the logic determines ball/strike for the strike zone parameters adjusted for a particular jersey number of the batter of interest. Upon determination whether a pitch can be qualified as a "strike" or a "ball," the logic flows to block 166 where the results are reported over wireless (or wired) interface to the remote controller.

In an embodiment of the present invention, more specific computations for the height are as follows:

As the ball passes through a curtain of light from the LEDs, the resulting scattered light signal as a function of time is modeled as:

$$I(t) = I_0 e^{-t^2/\sigma^2} \quad \text{(Eq. 2)}$$

The light signal has its half amplitude points when $e^{-t^2/\sigma^2} = \frac{1}{2}$. The width d of a light curtain at height h is h tan θ, where θ is the half angle of the expanding curtain in the vertical direction. The time for the ball to cross the curtain between its half light scattered intensity points is t=d/v, where v is the velocity of the ball. Consequently the value of σ must satisfy:

$$e^{-d^2/4\sigma^2 v^2} = \frac{1}{2} \quad \text{(Eq. 3)}$$

which gives $$\sigma = \frac{d}{2v\sqrt{\ln 2}} \text{ and } \sigma = \frac{h \tan \theta}{v\sqrt{\ln 2}}$$

so the time dependence of the scattered light signal is fitted to:

$$I(t) = I_0 e^{-v^2 t^2 \ln 2/h^2 \tan \theta^2} \quad \text{(Eq. 4)}$$

which for small angles θ can be written as:

$$I(t) = I_0 e^{-v^2 t^2 \ln 2/h^2 \theta^2} \quad \text{(Eq. 5)}$$

The velocity is determined by the ball transit time between the two light curtains, so h can be determined from the fitted light signal as a function of time.

Both general ambient light and random fluctuations therein will also be received by the photodetectors 64, and must be compensated against in order for the computations of the system to consider only light resulting from the motion of the ball. Processes for these compensations will now be described.

The general ambient light may be several orders of magnitude higher than the scattered light signals produced by the ball intersecting the light beams, and therefore is preferably accounted for prior to the TIA 94 in order to avoid saturation. This process is preferably conducted immediately before each pitch, for example as soon as the light beams 52 are generated at block 240 of FIG. 9, to ensure that the ambient compensation accounts for any specific ambient lighting conditions surrounding the pitch. In FIG. 10, this process may occur simultaneously with block 142.

Figure 11:
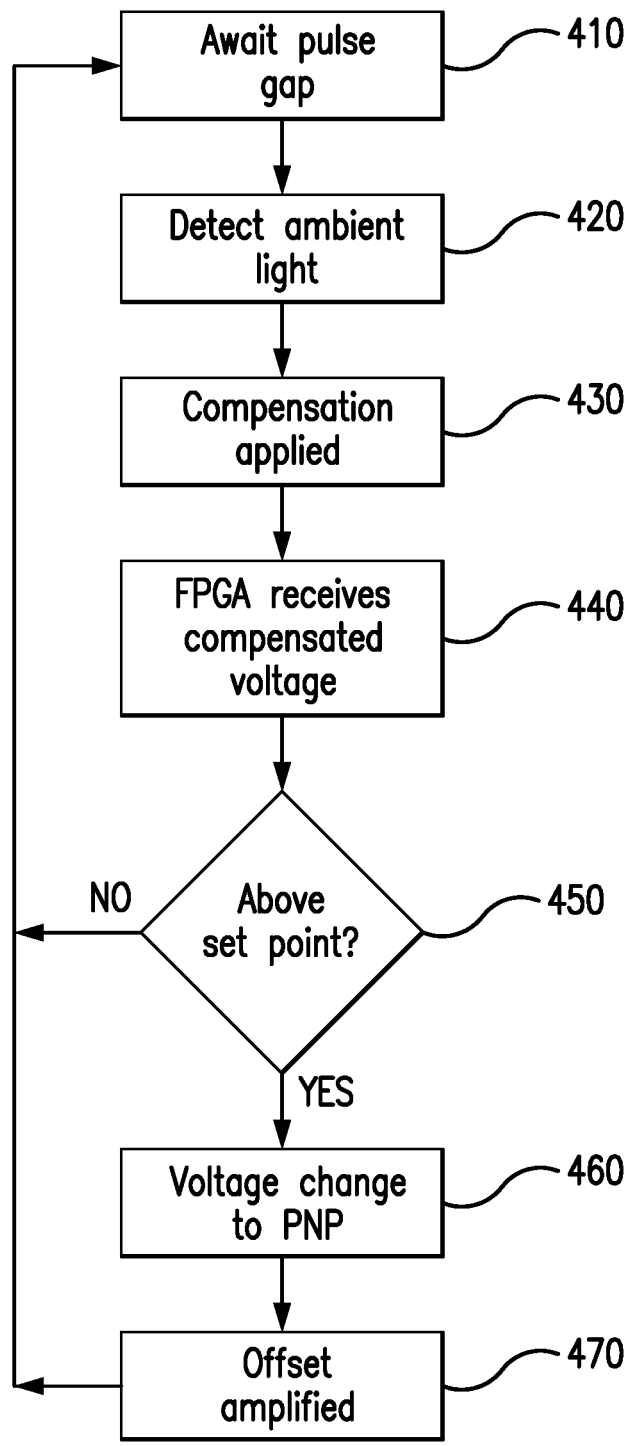
FIG. 11 is a flow chart diagram of a process for ambient light compensation of received light signals in a photodetector, according to an embodiment of the present invention.

This process is depicted by the block flowchart of FIG. 11. Reference back to FIGS. 5 and 6 may also be helpful.

The process begins by awaiting a gap between pulses of the light emitters 50, at block 410. In embodiments where the pulses of the light emitters 50 alternate, all emitters should be off during the gap. Preferably, the process specifically awaits a time within this gap immediately before at least one of the light emitters 50 begins emitting a pulse.

During the gap, the light emitters 50 are not emitting light; therefore any light received by a photodetector 64 can be assumed not to be the result of pulses from the light emitters 50, but purely due to ambient conditions. This ambient light is received and detected by a photodetector 64 at block 420, and an existing ambient compensation is applied to the photodetector 64 at block 430 by a PNP transistor 96. For a first iteration of the process, the level of existing compensation may be no compensation, or may be a base level which has been pre-set and/or stored.

The PNP transistor 96 applies this compensation in the form of an offset current to the cathode of the photodetector 64, decreasing the photocurrent of the photodetector 64 accordingly. The PNP transistor 96 may have its emitter tied to a precision voltage reference 128.

The compensated photocurrent is then converted to a voltage by the TIA 94 and subsequently read by the FPGA 78 at block 440, through various processes previously described.

The FPGA 78 now checks whether this voltage is greater than a desired set-point at block 450. This set-point is preferably 0V, but may also be the lowest possible voltage over the range of <5V or <10V for which voltage fluctuations do not lower the voltage to 0V.

If the set-point is not exceeded at block 450, the present compensation is sufficient and the process returns to block 410 to await a new gap between pulses.

If the set-point is exceeded at block 450, at block 460 the FPGA 78 signals to a DAC 126 to send a voltage to the PNP transistor 96. In response to the new voltage, the PNP transistor 96 amplifies its compensation offset current at block 470, which will be applied to the photodetector 64 at the next block 430. The process returns to block 410 to await a new gap between pulses.

By applying the process of FIG. 11, the majority of ambient light may be removed from the measurements at the photodetectors 64, operating in a closed feedback loop with the FPGA 78 and the ambient light compensation circuit 92.

Additional random fluctuations in lighting conditions may then be considered separately as follows.

Due to the discretely pulsed nature of the light emitters 50 and therefore the scattered light signals 66 received by the photodetectors 64, the system may again measure the output of the photodetectors 64 immediately before each pulse to determine present baseline lighting conditions absent a scattered light signal. Therefore, a baseline voltage representing present "off-pulse" conditions is re-determined immediately before each pulse, and the FPGA 78 directly subtracts this present baseline voltage from the voltage measured during said pulse, resulting in very accurate compensation of the voltage caused by lighting fluctuations. Preferably, these measurements have the general ambient compensation from the process of FIG. 11 already applied. Also preferably, this subtracted baseline voltage further includes the average "on-pulse" difference voltage which was determined, for example, in block 142 of FIG. 10.

Returning to FIG. 8A, background light can be seen to fluctuate in background lighting curves 182*a*, 182*b* for two photodetectors 64*a*, 64*b* over the course of a pitch. The background lighting curves 182*a*, 182*b* are then subtracted from the "raw" voltage curves 181*a*, 181*b* to result in compensated voltage curves 183*a*, 183*b* which are more representative of the results of the pitch itself.

Figure 12A:
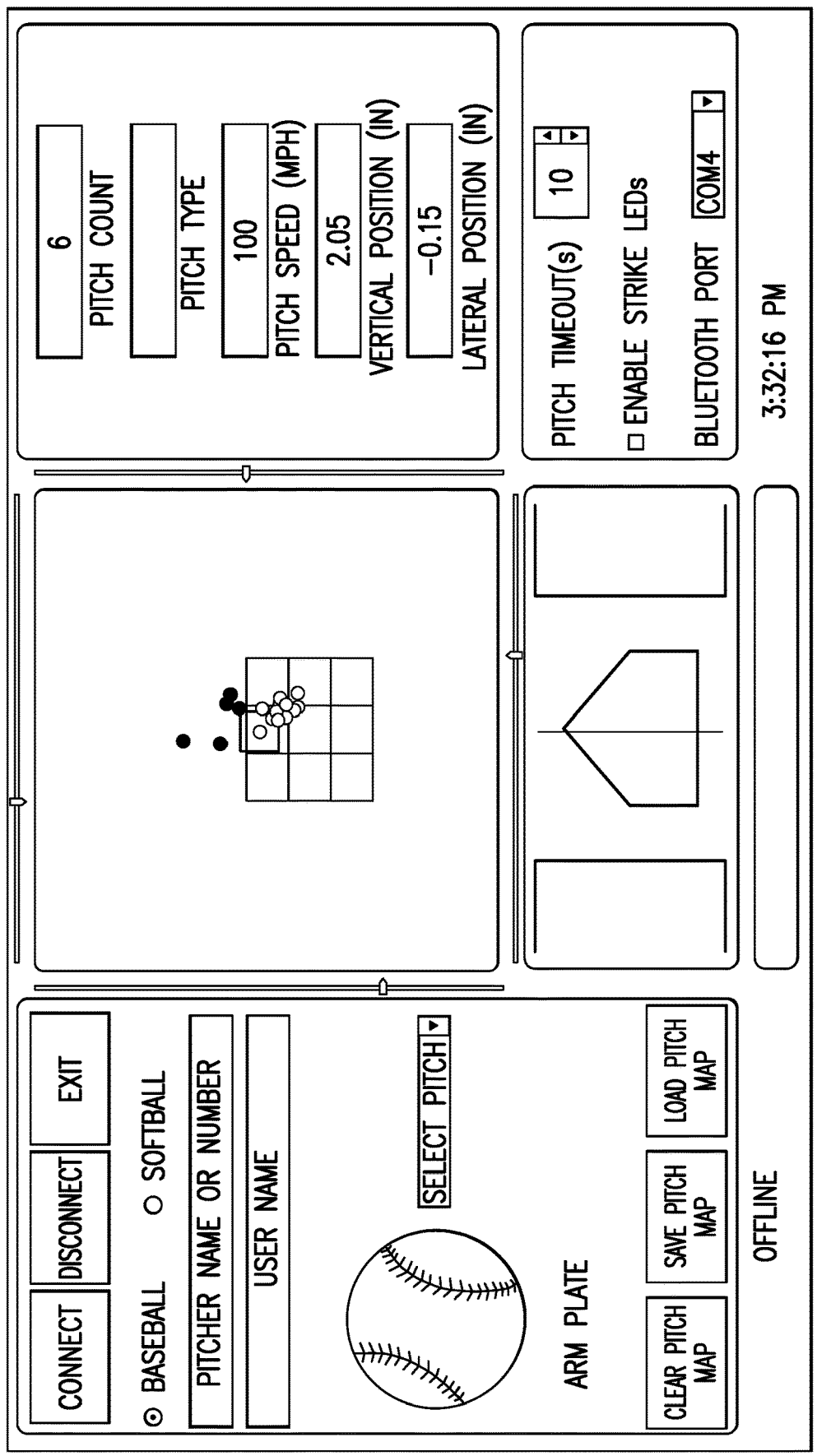
FIGS. 12A and 12B are graphical user interface (GUI) screens for control of the electronic home plate and examination of its output, according to an embodiment of the present invention.

Any number of user interfaces for the system may be envisaged, which may or may not be integrated with the remote controller 54 and its ON, OFF, and CLEAR buttons 86, 88, 90. FIG. 12A depicts one possible graphical user interface (GUI) which is. This example GUI provides position and speed results along with both XY and trajectory pitch maps, and allows for selection of "softball" or "baseball" which may be relevant to calibrating for expected size and speed range of the ball. Connection controls between the EHP 30 and the GUI are also provided, and the EHP 30 may be armed or disarmed (that is, turned ON or OFF) by actuating the baseball icon. The GUI is presently arranged for pitcher training purposes, and therefore also allows entry of a pitcher's name or number and selection of the intended pitch style, and may save or load the pitch maps for later review. Another GUI arrangement, arranged for the purposes of a live game, might instead allow entry of a batter's name or number to adjust the strike zone.

Figure 12B:
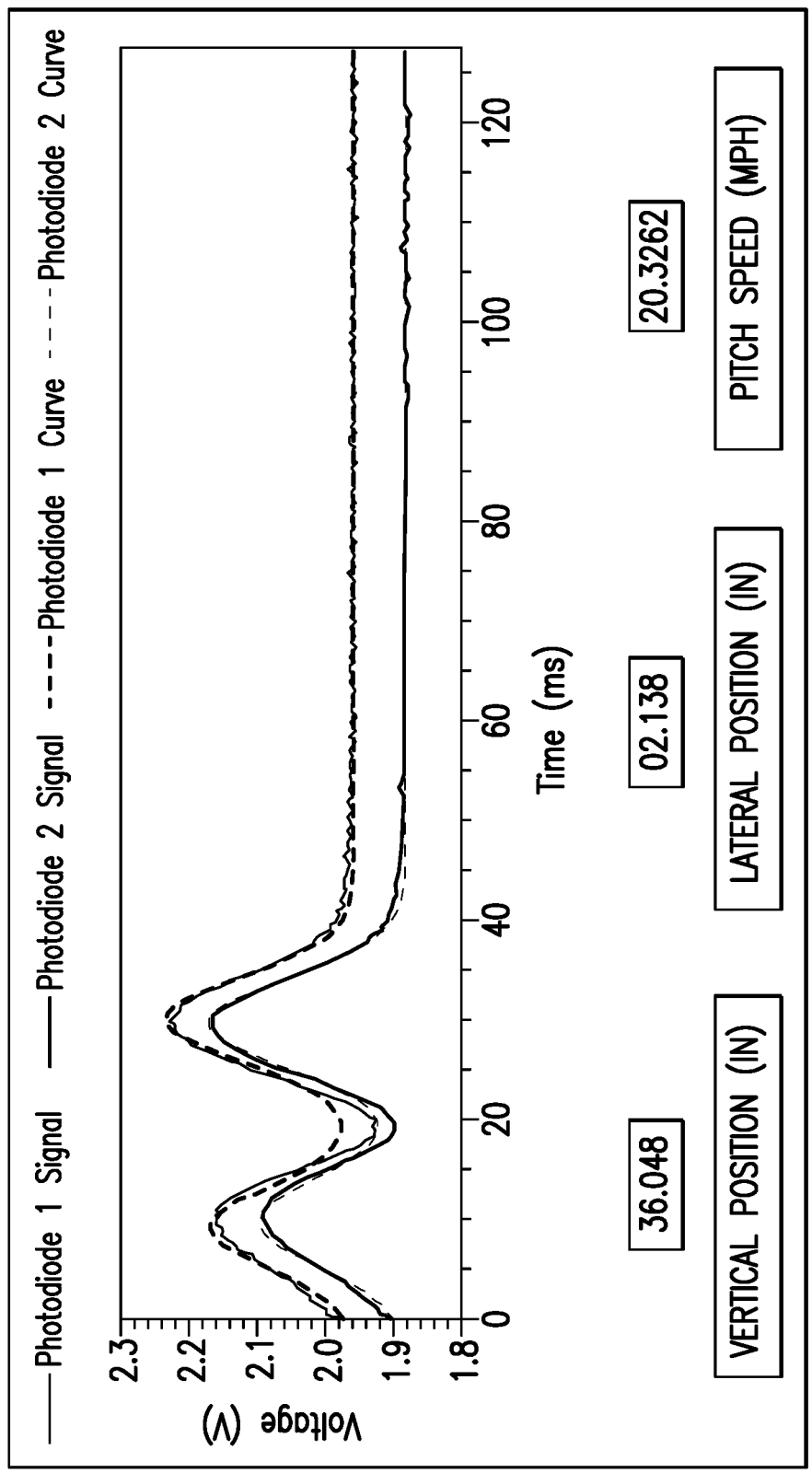

Additionally, FIG. 12B depicts an output of an embodiment of the system with non-alternating light emitter sets 48 and two photodetectors 64, displaying both the actual and curve-fitted data points of the photodetectors 64 as well as position and speed computation results, which may be displayed in a subscreen of a GUI.

Numerous other GUIs, complete with combinations of controls and subscreens, may be envisaged by those of skill in the art, of which the above descriptions are but examples. It is also contemplated that additional GUIs may be provided to non-officials, in the form of a smartphone application or other software, which provide information such as "strike" status and location/speed of the pitch without allowing control of the EHP 30 or its components.

It is again noted that a hardware implementation of the invention is not limited to use of a field programmable gate array (FPGA). As alternatives, embodiments of the invention may comprise a dedicated processor or processing portions of a system on chip (SOC), or other such suitable measures, executing processor instructions for performing the functions described herein or emulating certain structures defined herein. Suitable circuits using, for example, discrete logic gates such as in an Application Specific Integrated Circuit (ASIC) or Programmable Logic Array (PLA) may also be developed to perform these functions.

Furthermore, in a software implementation, the above and related algorithms, and other necessary instructions, may be encoded as executable instructions on one or more non-transitory computer readable media, such as hard disc drives or optical discs, and executed using one or more computer processors, in concert with an operating system or other suitable measures.

For brevity and convenience, this specification has largely described embodiments of the invention directed specifically to the detection of a baseball or softball traveling over an electronic home plate. However, it is noted that the scope of the invention is not limited to this context, and those of skill in the art will be able to modify the disclosed embodiments to measure the speed, trajectory, or other movement characteristics of projectiles of any kind.

For instance, in other sporting contexts, various embodiments of the invention could measure movement characteristics of moving golf balls, basketballs, soccer balls, etc. at any point in their motion, to analyze whether said characteristics are ideal. One example may be an installation under the tee of a golf course, measuring golf ball speed and trajectory off of a club at the time of impact, while another example may be an installation under the hoop of a basketball court, measuring basketball speed and trajectory as it enters (or misses) the net.

Outside a sporting context, movement characteristics are also of consequence to ballistic weapons, especially but not exclusively artillery and other long-range weapons where precision is vital. An embodiment of the invention might therefore be set up on a firing range, or even in the field, to measure trajectory features of a projectile at its source, target, or any point in between. Those of skill in the art will be able to imagine still other applications of the invention.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method operations may be substituted for those specifically shown and described, and certain features may be used independently of other features, and all or some of the above embodiments may be selectively combined with each other, and in certain cases, particular locations of elements or sequence of method operations may be reversed or interposed, all without departing from the spirit or scope of the disclosed system and method as defined in the appended claims.

What is claimed is:

1. A ball detection system comprising:
    a housing;
    first and second light emitter sets disposed in the housing, the second light emitter set disposed a predetermined distance behind the first light emitter set along an expected trajectory path of a ball, each light emitter set including a plurality of light emitters, each light emitter set configured to emit a series of discrete pulses of light;
    one or more photodetectors disposed in the housing, the one or more photodetectors generating a photocurrent when contacted by light, wherein, when a ball intersects a pulse of light of either of the light emitter sets, a scattered light signal is reflected from the ball to contact at least one of the one or more photodetectors;
    one or more ambient light compensation circuits coupled to the one or more photodetectors and reducing the photocurrent of each of the one or more photodetectors by an offset current;
    one or more converter circuits coupled to the one or more photodetectors and converting the photocurrent of each of the one or more photodetectors to a detection voltage; and
    a processor configured to:
        read at least two measurements of a detection voltage from one of the one or more converter circuits as at least two detection voltage data points, each detection voltage data point corresponding to the ball intersecting a respective one of at least two pulses of light represented by respective at least two peaks of the scattered light signals received at said one or more photodetectors,
        compensate each of said at least two detection voltage data points based on a baseline voltage value, thus forming at least two compensated detection voltage data points,
        fit said at least two compensated detection voltage data points to a voltage curve using a curve-fitting algorithm, and
        compute at least one vertical position of the ball from one or more voltages curves generated by the curve-fitting algorithm as a ratio of a width of one of said respective at least two peaks to a time gap between said at least two peaks.

2. The ball detection system of claim 1,
    wherein the one or more photodetectors include a left photodetector and a right photodetector each disposed in the housing between the first and second light emitter sets, the left and right photodetectors disposed symmetrically along an axis of a detection surface of the housing,
    wherein the one or more converter circuits include a left converter circuit converting a photocurrent of the left photodetector to a left detection voltage and a right converter circuit converting a photocurrent of the right photodetector to a right detection voltage, and
    wherein the processor is further configured to:
        fit a plurality of left detection voltage data points, measured from the left converter circuit, to a left curve,
        fit a plurality of right detection voltage data points, measured from the right converter circuit, to a right curve, and
        compute at least one lateral position of the ball from the left and right curve.

3. The ball detection system of claim 1, wherein the first and second light emitter sets each emit discrete pulses of light alternating with each other.

4. The ball detection system of claim 3,
    wherein the one or more photodetectors include a left photodetector and a right photodetector each disposed in the housing between the first and second light emitter sets, the left and right photodetectors disposed symmetrically along an axis of a detection surface of the housing,
    wherein the one or more converter circuits include a left converter circuit converting a photocurrent of the left photodetector to a left detection voltage and a right converter circuit converting a photocurrent of the right photodetector to a right detection voltage,
    the processor is further configured to:
        fit a first plurality of left detection voltage data points, measured from the left converter circuit when the first light emitter set emits a pulse of light, to a first left curve,
        fit a first plurality of right detection voltage data points, measured from the right converter circuit when the first light emitter set emits a pulse of light, to a first right curve,
        fit a second plurality of left detection voltage data points, measured from the left converter circuit when the second light emitter set emits a pulse of light, to a second left curve,
        fit a second plurality of right detection voltage data points, measured from the right converter circuit when the second light emitter set emits a pulse of light, to a second right curve,
        compute the at least one vertical position of the ball from either the first left and second left curve or the first right and second right curve, and
        compute at least one lateral position of the ball from either the first left and first right curve or the second left and second right curve.

5. The ball detection system of claim 1,
    wherein the baseline voltage value is a measurement of a detection voltage of one of the one or more converter circuits measured when neither the first nor second light emitter sets emit light, and
    wherein the processor is further configured to:
        determine the present baseline voltage value before each discrete pulse of light emitted by the first and second light emitter sets, and compensate a detection voltage data point by subtracting the present baseline voltage value from the value of the detection voltage data point.

6. The ball detection system of claim 1,
wherein the one or more ambient light compensation circuits each include a PNP transistor, each PNP transistor applying the offset current to a corresponding one of the one or more photodetectors, and
wherein a value of the offset current is selected when a corresponding one of the one or more converter circuits outputs a detection voltage value greater than a predetermined set-point while neither the first nor second light emitter sets emit light, the offset current selected to alter the detection voltage value to or below the predetermined set-point.

7. The ball detection system of claim 6, wherein the predetermined set-point is 0 V.

8. The ball detection system of claim 1, wherein the one or more converter circuits are transimpedance amplifier circuits.

9. The ball detection system of claim 1, wherein a narrow band filter covers the one or more photodetectors and blocks light external to a wavelength range emitted by the first or second light emitter sets.

10. The ball detection system of claim 1, wherein a narrow band filter covers the one or more photodetectors and blocks light external to a wavelength range of 940 nm±25 nm.

11. The ball detection system of claim 1, wherein the first and second light emitter sets each emit the series of pulses of light in pulses of 25 μs with a 5% duty cycle.

12. The ball detection system of claim 1, wherein the curve-fitting algorithm is a nonlinear Levenberg-Marquadt curve fitting algorithm.

13. A method of detecting at least one vertical position of a ball, the method comprising:
emitting a series of pulses of light from first and second light emitter sets, the pulses of the first light emitter set alternating with the pulses of the second light emitter set;
generating a plurality of compensated detection voltage data points by repeatedly:
receiving, in one or more photodetectors, at least a first and a second scattered light signals resulting from the ball intersecting at least a first and a second pulses of light, respectively,
generating at least first and second photocurrents in at least one of the one or more photodetectors in response to receipt of the said at least first and second scattered light signal,
for each of said at least first and second photocurrents, reducing said each photocurrent of the at least one photodetector by an offset current using one or more ambient light compensation circuits, thus obtaining a reduced photocurrent for said each photocurrent,
converting said reduced photocurrent for said each photocurrent to a detection voltage in one or more converter circuits, thus obtaining at least first and second detection voltages for said at least first and second scattered light signals,
measuring a value of each of said at least first and second detection voltages as a detection voltage data point, and
compensating each detection voltage data point of said at least first and second detection voltages based on a baseline voltage value;
fitting at least a subset of at least first and second compensated detection voltage data points to one or more voltage curves using a curve-fitting algorithm, wherein said at least first and second compensated detection voltage data points correspond to respective at least first and second peaks of said at least first and second scattered light signals received at said one or more photodetectors when the ball intersects said at least first and second pulses of lights, respectively; and
computing the at least one vertical position of the ball from the one or more voltage curves as a ratio of a width of one of said respective first and second peaks to a time gap between said respective first and second peaks.

14. The method of claim 13, further comprising:
before emitting each pulse of the series of pulses of light:
generating an off-pulse photocurrent in at least one of the one or more photodetectors in response to ambient light levels,
reducing the off-pulse photocurrent by the offset current using the one or more ambient light compensation circuits,
converting the reduced off-pulse photocurrent to an off-pulse detection voltage in the one or more converter circuits, and
measuring a value of the off-pulse detection voltage as a present baseline voltage value,
wherein the compensation of the detection voltage data point includes subtracting the present baseline voltage value from the value of the detection voltage data point.

15. The method of claim 13,
wherein the one or more ambient light compensation circuits each include a PNP transistor, the PNP transistor applying the offset current to the least one photodetector, and
wherein a value of the offset current is selected when a detection voltage value greater than a predetermined set-point is measured while neither the first nor second light emitter sets emit light, the offset current selected to alter the detection voltage value to or below the predetermined set-point.

16. The method of claim 15, wherein the predetermined set-point is 0 V.

17. The method of claim 13, wherein the curve-fitting algorithm is a nonlinear Levenberg-Marquadt curve fitting algorithm.

18. A projectile detection system comprising:
a housing;
first and second light emitter sets disposed in the housing, the second light emitter set disposed a predetermined distance behind the first light emitter set along an expected trajectory path of a ball, each light emitter set including a plurality of light emitters, each light emitter set configured to emit a series of discrete pulses of light;
one or more photodetectors disposed in the housing, the one or more photodetectors generating a photocurrent when contacted by light, wherein, when a projectile intersects at least first and second pulses of light of either of the light emitter sets, at least a first and second scattered light signals are reflected from the ball to contact at least one of the one or more photodetectors;
one or more ambient light compensation circuits coupled to the one or more photodetectors and reducing at least a first and second photocurrents corresponding to said at least first and second scattered light signal of each of the one or more photodetectors by an offset current; and a processor configured to:

read an amplitude of at least a first and second detection photocurrents from one of the one or more photodetectors as at least a first and second detection data points, compensate each of said at least first and second detection data points based on a baseline data value, fit at least a first and second compensated detection data points to a data curve using a curve-fitting algorithm, and compute at least one vertical position of the ball from one or more data curves generated by the curve-fitting algorithm based on at least one characteristic of one of said at least first and second compensated detection data points and a time gap between said at least first and second compensated detection data points.

* * * * *